(12) United States Patent
Grenier et al.

(10) Patent No.: US 12,188,606 B2
(45) Date of Patent: Jan. 7, 2025

(54) BUILDING OF OPTOMECHANICAL SYSTEMS USING SELF-ALIGNED REFERENCE BALLS

(71) Applicant: Institut National D'Optique, Quebec (CA)

(72) Inventors: Martin Grenier, Quebec (CA); Nichola Desnoyers, Quebec (CA); Frederic Lamontagne, Quebec (CA); Mathieu Legros, Quebec (CA)

(73) Assignee: Institut National D'Optique, Quebec (CA)

( * ) Notice: Subject to any disclaimer, the term of this patent is extended or adjusted under 35 U.S.C. 154(b) by 749 days.

(21) Appl. No.: 17/449,874

(22) Filed: Oct. 4, 2021

(65) Prior Publication Data

US 2022/0107051 A1 Apr. 7, 2022

Related U.S. Application Data

(60) Provisional application No. 63/086,797, filed on Oct. 2, 2020.

(51) Int. Cl.
*G02B 7/02* (2021.01)
*F16M 11/22* (2006.01)

(52) U.S. Cl.
CPC .............. *F16M 11/22* (2013.01); *G02B 7/02* (2013.01); *F16M 2200/025* (2013.01)

(58) Field of Classification Search
CPC ..... F16M 11/22; F16M 2200/025; G02B 7/02
See application file for complete search history.

(56) References Cited

U.S. PATENT DOCUMENTS

| 9,244,245 B2 | 1/2016 | Lamontagne et al. |
| 9,470,870 B2 | 10/2016 | Lamontagne et al. |
| 2020/0264402 A1 | 8/2020 | Savard et al. |

FOREIGN PATENT DOCUMENTS

CN   112630923 A   *   4/2021

OTHER PUBLICATIONS

CN 112630923, translation (Year: 2021).*

* cited by examiner

*Primary Examiner* — Wen Huang
(74) *Attorney, Agent, or Firm* — Woodard, Emhardt, Henry, Reeves & Wagner, LLP

(57) ABSTRACT

The building of systems on breadboards such as optomechanical systems using reference stop assemblies is presented. Each reference stop assembly has a threaded base engageable with the breadboard to removably mount the reference stop assembly thereto, a support shaft connected to the threaded base and a reference ball. The reference ball is captively mounted to the support shaft and has a translational play in a plane perpendicular to the support shaft. The reference stop assembly also includes a clamping member mounted to the support shaft over the reference ball. The reference stop assembly is configured such that, when the reference stop assembly is mounted to said breadboard, the support shaft projects normally to the mounting surface of the breadboard and the clamping member cooperates with the breadboard so as to apply a clamping force to clamp the reference ball against a circular seat of a mounting hole on the breadboard.

26 Claims, 18 Drawing Sheets

BUILDING OF OPTOMECHANICAL SYSTEMS USING SELF-ALIGNED REFERENCE BALLS

REFERENCE TO RELATED APPLICATIONS

This application claims the benefit of U.S. Patent Application No. 63/086,797, filed Oct. 2, 2020, which is hereby incorporated by reference.

TECHNICAL FIELD

The technical field generally relates to optomechanical systems and other systems in which the precise relative alignment of components is desired and more particularly concerns reference stop assemblies and their use.

BACKGROUND

In the optics/optomechanics industries and many other industries, alignment of multiple components such as optical elements is a key factor in the performance and precision of systems. For example, standard "off-the-shelf" optical mounts on breadboards are well-known in the art and easy to acquire and use. However, each individual optical element usually has to be aligned by skilled personnel, and the alignment does not withstand most of shipping and industrial environmental conditions.

It is also known in the art to use custom-designed mechanical parts to achieve precise optical elements positioning, such as for example the retaining rings and other components used to mount lenses in the barrel of cameras. Such designs can improve ruggedness for shipping and industrial environmental conditions.

Almost all new optical systems require demonstration work done using the standard components in a lab environment. The alignment of each lens or optical element of an optical system is a tedious and difficult task, which can range in hours to multiple days of work. Moreover, extensive engineering work can be required to achieve a state where the same optical design can be built using custom components to meet the ruggedness level required to withstand shipping conditions without loosing factory calibration settings.

With the ever-increasing speed of product development to achieve fast "time-to-market" goals, there is a need for a solution that is easy to use for prototyping, requires less or no individual optical element alignment and is sufficiently robust to be used out of the laboratory environment and shipped to end users without loosing its factory calibration. While the breadboards and optomechanical mounts currently available on the market are well designed to achieve maximum flexibility and ease of use, they all lack the same feature: precise and repeatable positioning.

There remains a need for tools to build optomechanical assemblies that alleviate at least some of the above-mentioned drawbacks of the prior art.

SUMMARY

In accordance with one aspect, there is provided a reference stop assembly for use in building a system on a breadboard having a mounting surface provided with a plurality of mounting holes, the reference stop assembly comprising:
- a threaded base engageable with the breadboard to removably mount the reference stop assembly thereto;
- a support shaft connected to the threaded base;
- a reference ball captively mounted to the support shaft and having a translational play in a plane perpendicular to said support shaft; and
- a clamping member mounted to the support shaft over the reference ball;
- wherein said reference stop assembly is configured such that, when the reference stop assembly is mounted to said breadboard, the support shaft projects normally to the mounting surface of the breadboard and the clamping member cooperates with the breadboard so as to apply a clamping force to clamp the reference ball against a circular seat of one of the mounting holes of the breadboard.

In some implementations, the reference ball comprises a clearance channel extending through a diameter axis thereof, the support shaft extending through said clearance channel with said translational play therebetween; and the clamping member comprises a locking pin affixed to the support shaft, the reference ball extending between the threaded base and the locking pin. The support shaft may project integrally from the threaded base or may be screwed into the threaded base.

In some implementations, the reference stop assembly comprises:
- a support clip affixed to the support shaft; and
- a side-mounting mechanism loosely mounting the reference ball to the support clip alongside the support shaft;
- wherein the support clip comprises a flange projecting sideways from the support shaft over the reference ball and defining the clamping member.

In some implementations, the side-mounting mechanism comprises one of an arrangement of magnets affixed to the support clip and a flexible ribbon affixed to the support clip.

In accordance with another aspect, there is provided a method for building an optomechanical system, comprising:
a. providing a breadboard having a mounting surface and a plurality of mounting holes extending through the mounting surface, the mounting holes each having a threaded cavity and at least some of the mounting holes comprising a circular seat parallel to the mounting surface;
b. mounting one or more optomechanical structures on said breadboard, said mounting comprising, for each optomechanical structure:
  i. providing two or more reference stop assemblies, each reference stop assembly comprising a threaded base, a support shaft connected to the threaded base, a reference ball captively mounted to the support shaft and having a translational play in a plane perpendicular to said support shaft, and a clamping member mounted to the support shaft over the reference ball;
  ii. associating each reference stop assembly with one of the mounting holes of the breadboard having a circular seat so as to define a positioning reference for said optomechanical structure, and screwing the threaded base of each reference stop assembly into the threaded cavity of the associated mounting hole until the corresponding reference ball is clamped against the circular seat of the associated mounting hole by the clamping member; and
  iii. positioning the optomechanical structure on the mounting surface of the breadboard against the reference balls of said reference stop assemblies, and securing the optomechanical structure to the breadboard in position.

In some implementations, the method further comprises, after the mounting of the one or more optomechanical structures, removing the reference stop assemblies from the breadboard.

In some implementations, each of the at least some of the mounting holes comprising a circular seat comprises an enlargement between the threaded cavity and the mounting surface, the circular seat extending in the enlargement and having a diameter larger than a diameter of the threaded cavity. The enlargement may have a conical frustum shape.

In some implementations, at least one of the one or more optomechanical structures has an optical axis and comprises an optical mount and an optical element rigidly affixed to said optical mount and precisely aligned with said optical axis. The optical mount may have one or more reference surfaces, and the positioning of the optomechanical structure comprises abutting said one or more reference surfaces on the reference balls of the associated reference stop assemblies. At least one of the one or more optomechanical structures may be free of any optical element adjustment mechanism.

In some implementations, for each of said reference stop assemblies the reference ball comprises a clearance channel extending through a diameter axis thereof, the support shaft extending through said clearance channel with said translational play therebetween; and the clamping member comprises a locking pin affixed to the support shaft, the reference ball extending between the threaded base and the locking pin. The support shaft may project integrally from the threaded base or may be screwed into the threaded base.

In some implementations, each of said reference stop assemblies comprises:
a support clip affixed to the support shaft; and
a side-mounting mechanism loosely mounting the reference ball to the support clip alongside the support shaft;
wherein the support clip comprises a flange projecting sideways from the support shaft over the reference ball and defining the clamping member.

In accordance with another aspect, there is provided a kit for the building of an optomechanical system, comprising a plurality of reference stop assemblies as above, and a plurality of optomechanical mounts, each optomechanical mount having one or more reference surfaces configured to abut on the reference balls of the reference stop assemblies.

In some implementations, for one or more of said reference stop assemblies the reference ball comprises a clearance channel extending through a diameter axis thereof, the support shaft extending through said clearance channel with said translational play therebetween; and the clamping member comprises a locking pin affixed to the support shaft, the reference ball extending between the threaded base and the locking pin. The support shaft may project integrally from the threaded base or may be screwed into the threaded base.

In some implementations, one or more of said reference stop assemblies comprises:
a support clip affixed to the support shaft; and
a side-mounting mechanism loosely mounting the reference ball to the support clip alongside the support shaft;
wherein the support clip comprises a flange projecting sideways from the support shaft over the reference ball and defining the clamping member.

In some implementations, one or more mounts of the plurality of optomechanical mounts has an optical element rigidly affixed to said one or more mounts.

In some implementations, the kit further comprises a breadboard having a mounting surface and a plurality of mounting holes extending through the mounting surface, the mounting holes each having a threaded cavity, and at least some of the mounting holes comprising a circular seat parallel to the mounting surface. Each of the at least some of the mounting holes of the breadboard may comprise a circular seat comprises an enlargement between the threaded cavity and the mounting surface, the circular seat extending in the enlargement and having a diameter larger than a diameter of the threaded cavity. The enlargement may have a conical frustum shape.

Other features and advantages of the invention will be better understood upon reading of embodiments thereof with reference to the appended drawings.

DETAILED DESCRIPTION

Figure 1:
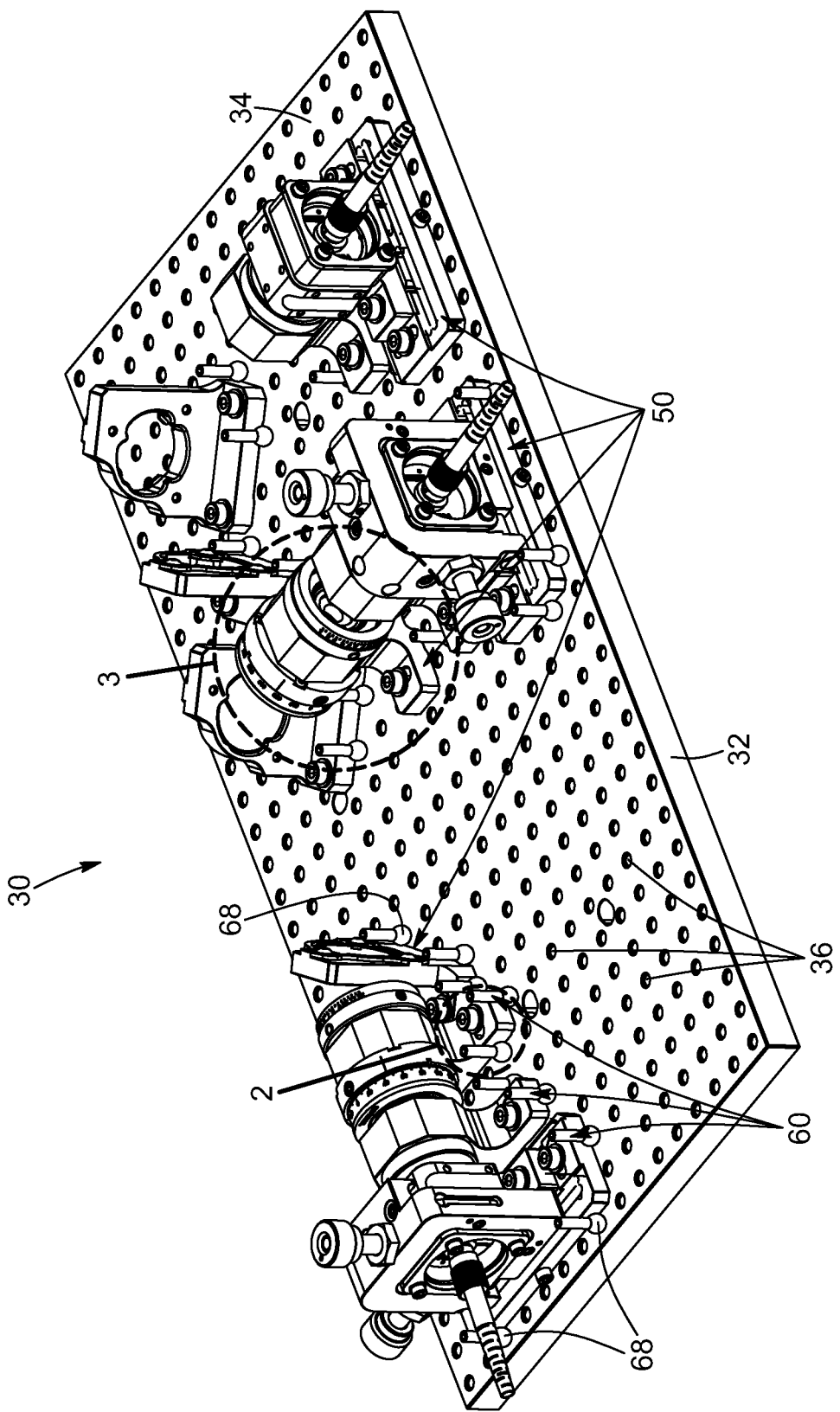
FIG. 1 is an isometric view of an optomechanical system built using reference stop assemblies according to one embodiment.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e., the limitations of the measurement system. It is commonly accepted that a 10% precision measure is acceptable and encompasses the term "about".

In the present description, when a broad range of numerical values is provided, any possible narrower range within the boundary of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e., with decimal value, is also contemplated.

The present description relates to reference stop assemblies and their use on breadboards to enable the precise positioning of optical elements without the need for manual alignment.

In an optomechanical system composed of several optical elements (lenses, mirrors, prisms, sensors, etc.), multiple optical elements often need to be precisely positioned along a same optical axis while being centered on this axis. To locate and orient any solid body in space with precision, all six degrees of freedom of the body must be blocked: three degrees of translation (e.g., vertical, longitudinal and lateral) and three degrees of rotation (pitch, yaw and roll). In a typical optomechanical system having a plurality of optical elements in mounts affixed to a breadboard, the six degrees of freedom of each mount are blocked, but the mounts are not precisely located on the breadboard and relative to each other, leading to the need to fine-tune the position of each individual optical element in its corresponding mount in order to provide the desired alignment with the optical axis of the system.

In accordance with some implementations, a mount-to-mount localization may be achieved with high precision by providing reference stop assemblies as described herein. The reference stop assemblies include reference balls which can be precisely located in mounting holes machined in a breadboard, and the mounts are referenced against these reference balls. In some embodiments, the mounting holes of typical breadboards that normally serve to clamp optomechanical mounts are slightly modified to provide appropriate seatings for the reference balls. These reference balls act as positioning stops to precisely locate the optical mounts on the breadboard. Embodiments presented herein include methods for building an optomechanical system, robust optomechanical systems built according to such methods, kits and components for the building of optomechanical systems.

Figure 3:
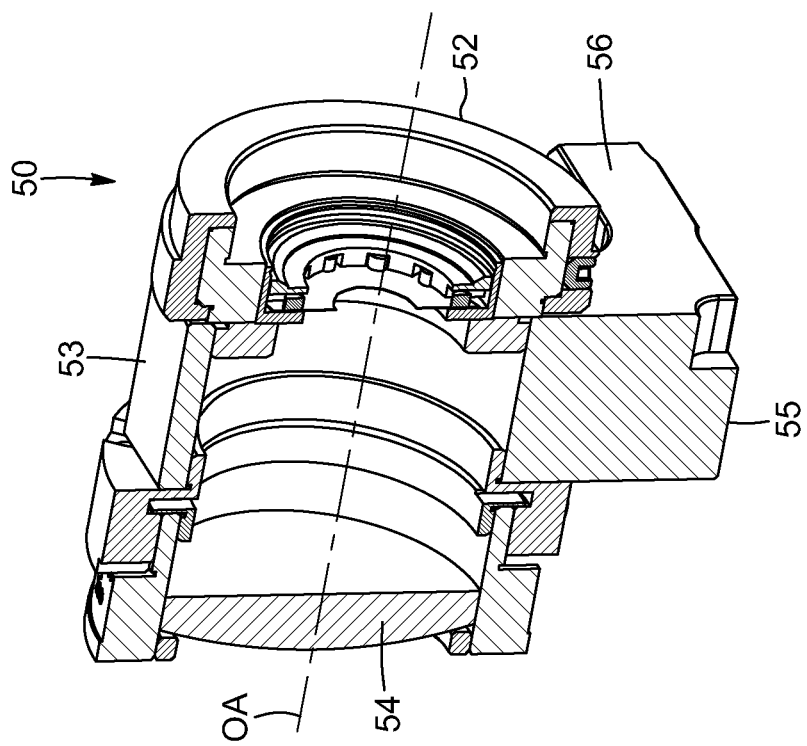
FIG. 3 is a cross-sectional view of an optomechanical mount of the system of FIG. 1.
Figure 2:
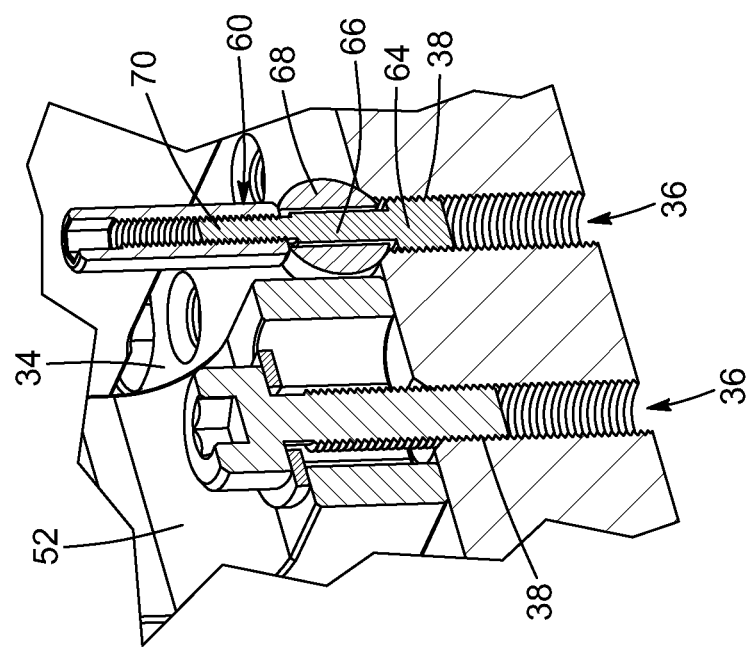
FIG. 2 is a cross-sectional view of a zone of the system of FIG. 1 showing the mounting base of an optomechanical structure abutting the reference ball of a neighboring reference stop assembly.

With reference to FIGS. 1, 2 and 3, there is provided a method for building a system, for example an optomechanical system 30, according to one implementation.

The optomechanical system 30 may be embodied by a variety of set-ups including optical elements as known in the art. By way of example, the optomechanical system 30 may constitute or be a part of a laser system or a beam delivery system for industrial or medical devices or any other industrial applications. Other examples include spectrometers, optical delay lines, OCTs, FTIRs, metrology optical devices, interferometers, vision systems, optical processing units, illumination systems, projection systems, microscopy units, quantum intricating units, etc. It will however be understood that the reference stop assemblies such as described herein may alternatively be used in the building of other types of systems in which the precise relative alignment of components is desired, such as for example in the fields of metrology or manufacturing (assembly, machining, etc).

The method first includes providing a breadboard 32, also referred to in the art as an "optical breadboard". The expression "breadboard" is typically understood in the optical art to designate a plate supporting an optical assembly which is transportable, allowing the components of the assembly to be moved as a whole from one location to another. Breadboards can be placed on any support surface such as a table or a workbench or may be integrated into larger systems. In some implementations, the breadboard may be embodied by an optical table or bench or may be an integral part of such a table or bench. The breadboard 32 may be made of steel, aluminum, carbon fiber and the like.

The breadboard 32 has a mounting surface 34 and a plurality of mounting holes 36 extending through the mounting surface 34. The mounting surface 34 is generally embodied by the top surface of the breadboard 32. Each mounting hole 36 has a threaded cavity 38 (see FIG. 2) suitable to receive components of the optomechanical system such as mounts and reference stop assemblies. As will be readily understood by one skilled in the art, the mounting holes 36 may be distributed over the mounting surface 34 in a regular pattern that forms a square-shaped grid providing a uniform spacing between adjacent mounting holes 36 along two orthogonal directions. It will however be understood that different grid patterns, regular or irregular, may be envisioned without departing from the scope of protection. The breadboard 32 may include any number of mounting holes 36 sufficient to enable the mounting and positioning of multiple components as required by the system to build. By way of example, typical multi-purpose breadboards are provided with grids of equally spaced mounting holes 36 machined over their whole surface and having, for example, center-to-center spacings of 25 mm or 12.5 mm (1 or ½ inch). As explained further below, in some implementations at least some of the mounting holes 36 include a circular seat 42 parallel to the mounting surface 34.

The present method further includes mounting one or more optomechanical structures 50 at precisely selected positions on the breadboard 32, at least some of the structures 50 preferably including an optical element.

In accordance with one aspect, and as explained in detail further below, the method involves the use of two or more reference stop assemblies 60. Each reference stop assembly includes a threaded base 64 engageable with the breadboard 32 to removably mount the reference stop assembly 60 to the breadboard 32. The threaded base 64 of each reference stop assembly 60 is preferably configured to be screwed in the threaded cavities 38 of the mounting holes 36. Each reference stop assembly 60 also includes a support shaft 66 connected to the threaded base 64 and a reference ball 68 captively mounted to the support shaft 66 and having a translational play in a plane perpendicular to the support shaft 66. Finally, each reference stop assembly 60 includes a clamping member 70 mounted to the support shaft 66 over the reference ball 68. The reference stop assemblies 60 are configured such that, when the reference stop assembly 60 is mounted to the breadboard 32, the support shaft 66 projects normally to the mounting surface 34 of the breadboard 32 and the clamping member 70 cooperates with the breadboard 32 so as to apply a clamping force to clamp the reference ball 68 against the circular seat 42 of one of the mounting holes 36 of the breadboard 32.

The method further includes associating each reference stop assembly 60 with one of the mounting holes 36 of the breadboard having a circular seat 42, so as to define a positioning reference for the optomechanical structure 50, and screwing the threaded base 64 of each reference stop assembly 60 into the breadboard 32 until the corresponding reference ball 68 is clamped against the circular seat 42 of the associated mounting hole 36 by the clamping member 70.

The method next includes positioning the optomechanical structure 50 on the mounting surface 34 of the breadboard 32 against the reference balls 68 of the reference stop assemblies 60, and securing the optomechanical structure 50 to the breadboard 32 in position, using appropriate clamping hardware such as screws. After this mounting of optomechanical structures 50, the reference stop assemblies 60 may be removed from the breadboard 32, although in some implementations the reference stop assemblies 60 may be left on the breadboard 32 without departing from the scope of protection.

According to various implementations, the optomechanical structures 50 may be embodied by subassemblies of components typically found in an optical system. In some implementations, one or more of the optomechanical structures 50 may be embodied by an optical or optomechanical mount 52 in which an optical element 54 such as a lens or the like is mounted. Referring more particularly to FIG. 3, an optomechanical mount 52, also designated herein for short simply as "mount", can be described as a support structure that contains at least one support surface 55, usually flat, to interface with the mounting surface 34 of the breadboard 32. The optomechanical mount 52 also includes at least one reference surface 56, typically two or more, positioned and oriented with respect to the support surface 55 and shaped to interface with the reference balls of the reference stop assemblies when both are mounted next to each other on the breadboard. The number and distribution of reference surfaces 56 are selected so as to enable the locking of a sufficient number of degrees of freedom of the optomechanical mount 52. The optomechanical mount 52 may further includes a mechanical interface to hold an optical element 54 at a known precise position with respect to its support and reference surfaces, for example a barrel 53 and associated components. The optomechanical mount may be designed to set the optical element in a specific and precise position when the optomechanical mount is correctly registered against the reference stop assemblies mounted on the breadboard and associated to the mount. The mounts 52 also typically include mounting features such as through holes or screws and the like, a flange which can be clamped to the breadboard, etc., enabling the securing of the mount 52 to the breadboard 32. It will however be readily understood that the optomechanical structures 50 on a given breadboard 32 may be embodied by other types of components, such as for example smaller breadboard plates, as explained further below.

Each one of the optical elements 54 may be embodied by any component acting on light in some fashion, for example to direct or change the direction of a light beam, focus or expand, collimate, filter, or otherwise transform or affect light. Examples of optical elements include lenses of any type, such as for example, plano-convex, biconvex, plano-concave, biconcave, positive or negative meniscus lenses. Cemented doublet or triplet lenses of the types listed above can also be considered. The optical element 54 may also be embodied by diffractive lenses, mirrors, diffractive optical elements (DOEs), pinholes, or the like. The optical element 54 may have spherical or aspherical surfaces and may have an off-axis profile. In some embodiments, the optical element 54 may be embodied by a more complex subassembly of optical components such as for example one or more lenses mounted in an inner sleeve, a mirror or a lens mounted in a spider, etc. In other variants, the optical element 54 may be embodied by typical components of optical assemblies such as a prism, a wave plate or a camera. Other possibilities include optical fibers, optical detectors, corner cubes, light sources such as lasers, LEDs, LCDs, light bulbs, and the like, or a Micro-Opto-Electro-Mechanical System (MOEMS) such as for example a Digital Light Processing (DLP) system. It will be readily understood that in some embodiments more than one optical element 54 may be mounted within a same mount.

In accordance with some implementations, each optical element 54 is precisely aligned within the corresponding mount 52 so that the optical axis of the optical element 54 coincides with an optical axis defined by the mount. By way of example, in mounts 52 where the optical elements 54 are held within a barrel 53 or barrel-shaped structure, the central axis OA of the barrel 53 defines the optical axis OA of the mount. Techniques are known to ensure the precise positioning of optical elements 54 with respect to the associated mounts 52. By way of example, reference can be made to U.S. Pat. Appl. Pub. No. 2020/0264402 (SAVARD et al.) entitled "Centering of an optical element using edge contact mounting", U.S. Pat. No. 9,244,245 (LAMONTAGNE et al.) entitled "Auto-centering of an optical element within a barrel" and U.S. Pat. No. 9,470,870 (LAMONTAGNE) entitled "Optical assemblies with tilt-controlled mounting of an optical element in a barrel". The entire contents of these three patent documents are incorporated herein by reference. Other lens centering technologies or lens mount manufacturing techniques may also be used, such as for example the "drop-in" technique.

Preferably, for at least some of the optomechanical structures 50 the optical element 54 is rigidly affixed to the mount, that is, the optomechanical structure 50 is free of any optical element adjustment mechanism enabling the post-assembly alignment of the optical axis of the optical element 54. Advantageously, such an embodiment may improve the robustness of the resulting optomechanical system.

As mentioned above, even if a lens or other type of optical element 54 is well centered in its mount 52, this does not ensure that each mount 52 is well placed with respect to the other mounts 52 on the same breadboard 32. To achieve proper alignment of the optical axes of different optical elements mounted in different mounts 52, it is also required to precisely position these mounts 52 with respect to each other. Advantageously, the reference stop assemblies presented herein can be used to achieve this alignment.

Referring to FIGS. 10A, 10B, 11, 12 and 13, embodiments of reference stop assemblies 60 which may be used in the context of the present method are presented.

Figure 10A:
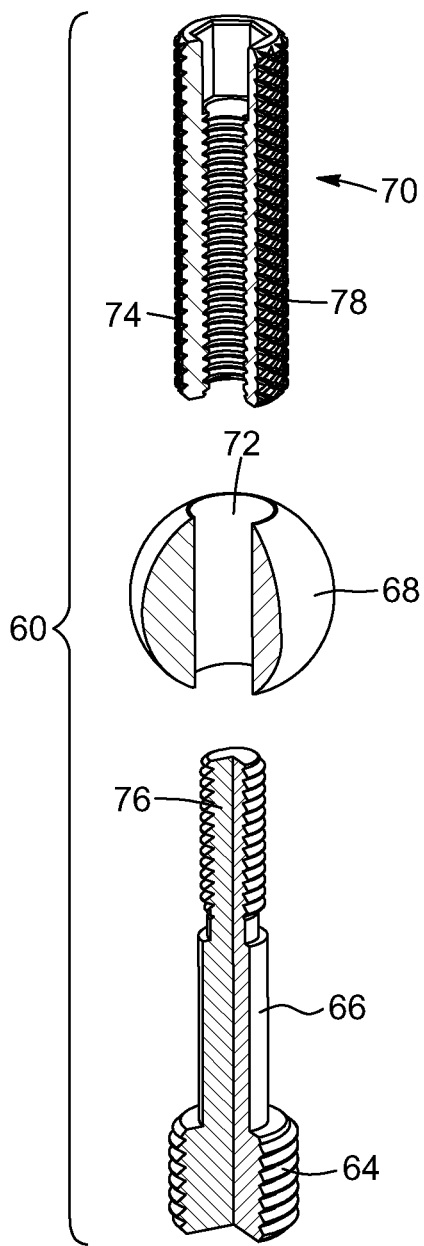
FIGS. 10A and 10B are exploded view of reference stop assemblies according to two variants in which the support shaft passes through the reference ball.
Figure 10B:
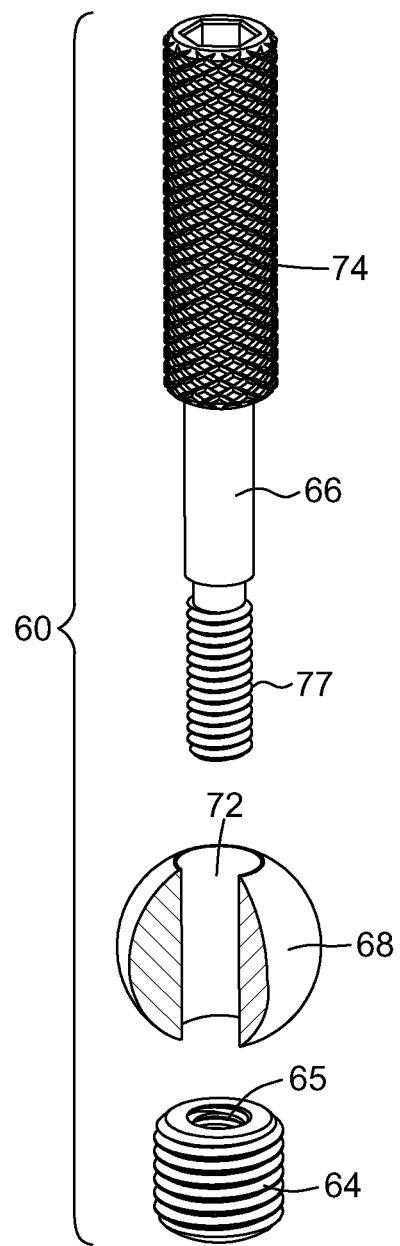

In the embodiments of FIGS. 10A and 10B, the reference ball 68 is traversed by a clearance channel 72 extending through a diameter axis, and the support shaft 66 extends through this clearance channel 72 with a translational play therebetween. The reference ball 68 is therefore loosely mounted around the support shaft 66. Still in the illustrated embodiments, the clamping member 70 includes or is embodied by a locking pin 74 which is affixed to the support shaft 66 over the reference ball 68, that is, the reference ball 68 extends between the threaded base 64 and the locking pin 74. Referring to FIG. 10A, in one variant the support shaft projects 66 integrally from the threaded base 64 and the locking pin 74 may for example be screwed to the top portion 76 of the support shaft 66 or affixed thereto by press fitting. The inner diameter of the clearance channel 72 of the reference ball 68 and the outer diameter of the support shaft 66 are selected to leave a significant play between the reference ball 68 and the support shaft 66. This play gives to the reference ball 68 sufficient freedom of motion to get correctly seated on the circular seat without any interference from the support shaft 66. The distance between the bottom part of the locking pin 74 and the upper part of threaded base 64 is designed to provide sufficient clearance for the motion of the reference ball 68 along the support shaft 66. The reference ball 68 is therefore free to move around the six degrees of freedom mentioned above, over a range sufficient to enable the reference ball 68 to set in its natural position on the circular seat 42 of the mounting hole 36 when the reference stop assembly 60 is inserted in this mounting hole 36.

Figure 13:
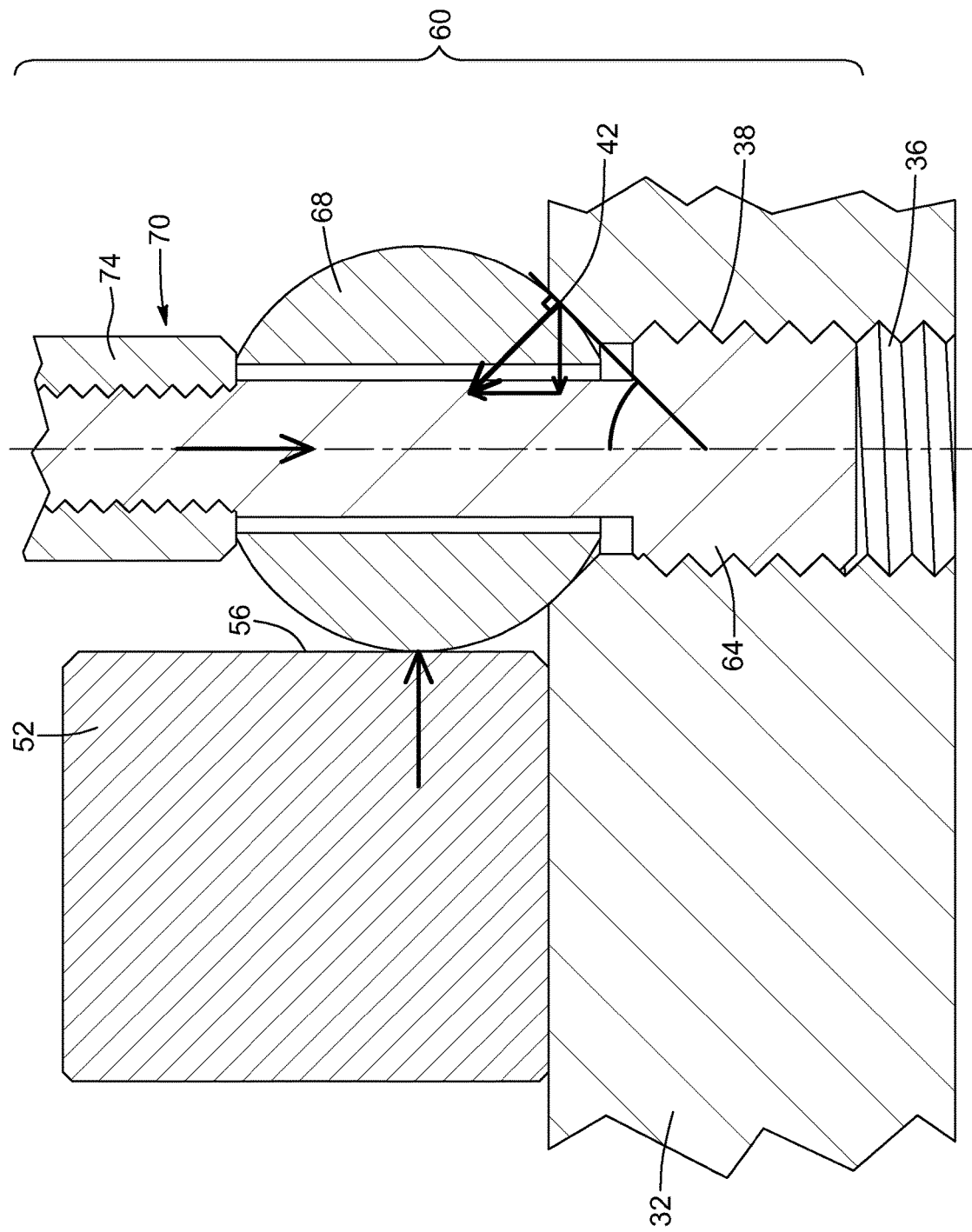
FIG. 13 is a cross-sectional view indicating the forces at play in the engagement of a mount with a reference stop assembly on a breadboard.

The engagement of the different components of the reference stop assembly 60 of FIG. 10A when screwed into one of the mounting holes 36 of the breadboard 32 is best illustrated in FIG. 13. The reference stop assembly 60 is screwed into the mounting hole 36 through the engagement of the complimentary threads on the threaded base 64 and the threaded cavity 38 of the mounting hole 36. Owing to the gravity, the reference ball 68 gets correctly seated simply by depositing it in the mounting hole 36. Screwing the reference stop assembly 60 in the mounting hole 36 then allows the locking pin 74 to press downwardly against the reference ball 68 until the ball gets fully squeezed between the circular seat 42 and the locking pin 74. Since the reference ball 68 has sufficient play to be correctly seated without any interference from the support shaft 66, the center of the reference ball 68 is found to be precisely located on the center axis of the circular seat 42, so that it will naturally centre itself in the mounting hole 36 and be held in this position by the vertical force exerted by the locking pin 74. One must keep in mind that to allow easy screwing of the threaded base 64, a certain play must exist between the threaded base 64 and the threaded cavity 38 of the mounting hole 36. This play then means that the support shaft 66, by itself, is likely to be slightly misaligned and off-center relative to the center axis of the circular seat 42. The correct positioning of a seated reference ball 68, independently of the own positioning of the support shaft 66, is at the foundation of the higher precision and better repeatability of the method of mounting optomechanical systems 30 via the use of the reference stop assemblies 60 described herein.

The components of the reference stop assembly 60 may further include design features facilitating its handling and ease of use. For example, the locking pin 74 may have a knurled outer surface 78 or other grip-friendly profile for easy handling with the fingers.

One skilled in the art will also understand that the components of the reference stop assembly 60 may be arranged according to different designs without departing from the scope of protection. By way of example, with reference to FIG. 10B, in one variant the support shaft 66 may be projecting downwardly from the locking pin 74 and screwed inside a threaded bore 65 of the threaded base 64. In this variant, the threaded base 64 is first affixed to a mounting hole 36 of the breadboard 32, and it is the screwing of the lower portion 77 of the support shaft 66 into the threaded base 64 which eventually brings the locking pin 74 into contact with the reference ball 68 and locks the reference ball 68 in position against the circular seat.

Figure 12:
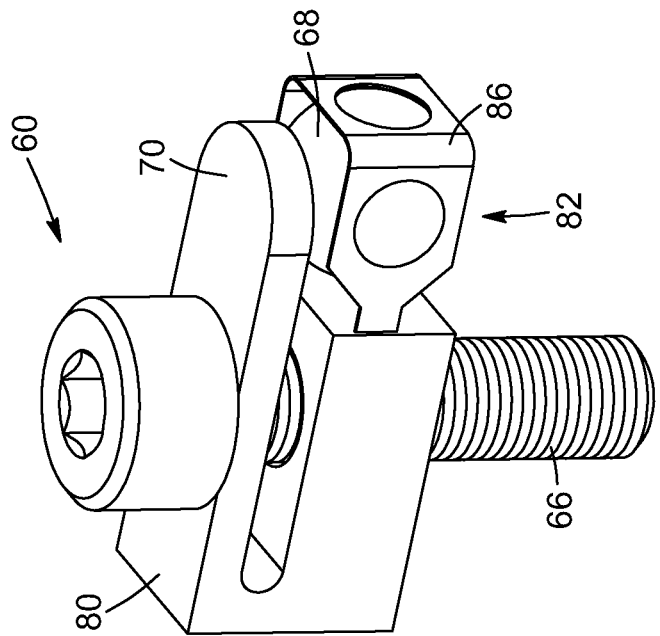
FIGS. 11 and 12 are isometric views of reference stop assemblies according to two variants in which the reference ball is mounted on a side of the support shaft.
Figure 11:
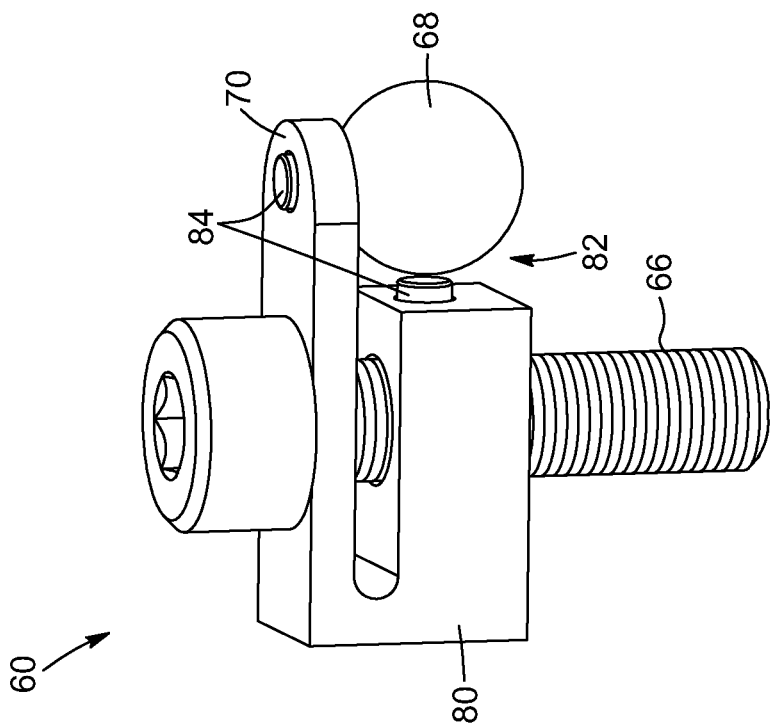

While the structural configurations shown in FIGS. 10A and 10B may advantageously provide versatile and simple embodiments, one skilled in the art will understand that other designs can be implemented to achieve the same result. For example, referring to FIGS. 11 and 12, the reference stop assembly 60 may include a support clip 80 affixed to the support shaft 66 and a side-mounting mechanism 82 for loosely mounting the reference ball 68 to the support clip 80 alongside the support shaft 66. The support clip 80 includes a flange projecting sideways from the support shaft 66 over the reference ball 68 and defining the clamping member 70. The side-mounting mechanism 82 preferably provides a sufficient level of play about all six degrees of freedom to allow the reference ball 68 to settle in the circular seat. It will be readily understood that in such variants, the threaded base 64 is screwed in one of the mounting holes 36 of the breadboard 32 while the reference ball 68 is seated in a neighboring one of the mounting holes 36. The side-mounting mechanism 82 may for example includes an arrangement of magnets 84 affixed to the support clip 80, such as shown in FIG. 11, or a flexible ribbon 86 or other link affixed to the support clip 80, such as shown in FIG. 12. Other variants such as a spring-loaded mechanism may also be considered. One advantage of such variants is that they do not require drilling a hole throughout the reference ball 68.

The reference balls 68 are preferably made of a hard material such as hardened steel, tungsten, ceramic or the like. The diameters of all the reference balls used in the building of a given optomechanical system are preferably consistent with each other to a precision dictated by the precision requirements in the positioning and alignment of the different optical elements of the optomechanical system. By way of example, variations of ±1.3 to ±2.5 μm (micrometers) in roundness and diameters of the reference balls of a same set may be adequate for typical optomechanical systems.

In some implementations, and with additional reference to FIGS. 8A to 8D and 9A to 9D, each mounting holes 36 has a threaded cavity 38 and an enlargement 40 extending between the upper end of the threaded cavity 38 and the mounting surface 34 of the breadboard 32. The threaded cavity 38 includes a set of cavity threads 46 projecting from the inner wall 44 of the cavity. The expression "threads" is meant to refer to engageable helicoidal projections on two components, allowing one component to be screwed on or within the other. By convention, a single thread is generally considered to be the portion of a helicoidal projection corresponding to one screw turn, whereas the length of the projection defining the entire screw path is referred to as threading or a set of threads.

Figure 8B:
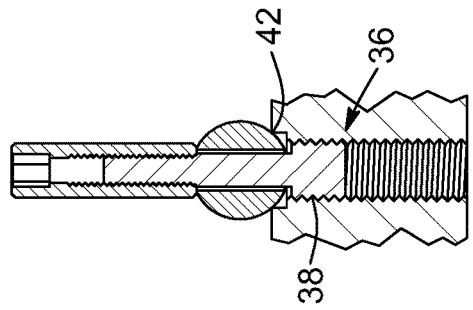
FIGS. 8A to 8D are top isometric views of mounting holes of a breadboard having enlargements of different shapes.
Figure 8A:
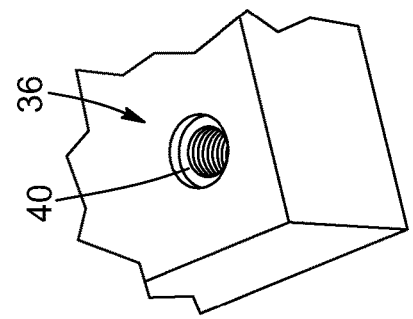
Figure 9A:
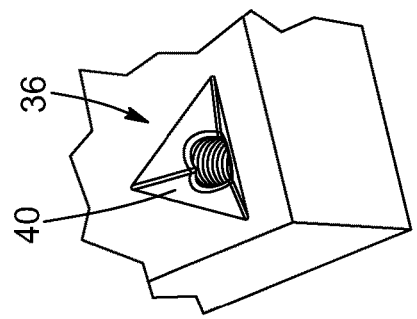
Figure 8D:
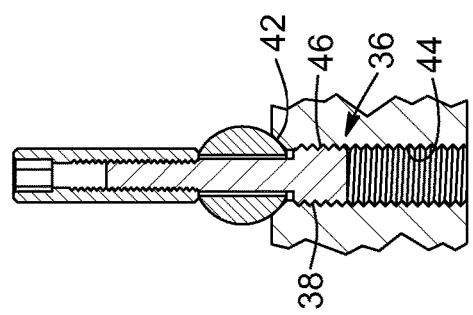
Figure 9D:
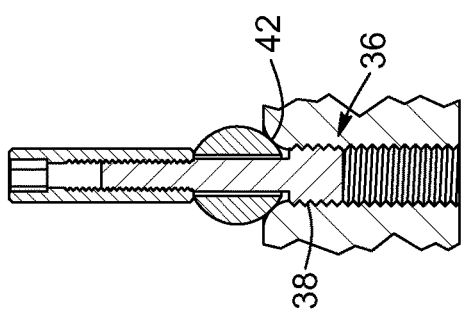
Figure 8C:
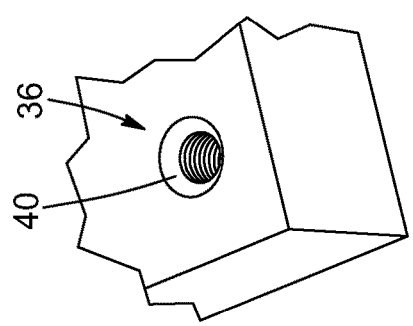
Figure 9C:
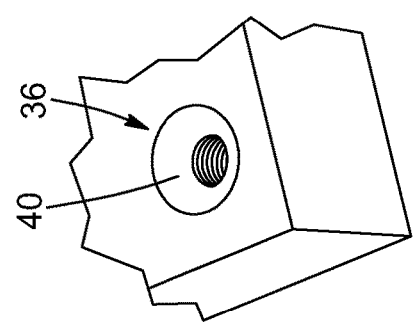

The circular seat 42 is preferably located in the enlargement 40 and it extends parallel to the mounting surface 34. In some implementations, the circular seat 42 has a diameter larger than a diameter of the threaded cavity 38, yet smaller than a diameter of the enlargement 40 at the mounting surface 34. In some embodiments, such as shown in FIGS. 8A and 9A, the enlargement 40 is shaped as a conical frustum, such that any cross-sectional segment thereof can define the circular seat 42, as will be explained in more details below. A conical frustum shape may for example be provided by the countersink left by the drilling of the threaded cavity 38 of the mounting holes 36. Other shapes for the enlargement 40 may however be used, such as for example a single annular corner edge (see FIGS. 8B and 9B), a torus shape (see FIGS. 8C and 9C), or three non-parallel planes forming a pyramidal frustum or the like (see FIGS. 8D and 9D).

In some implementations, the use of dedicated holes on the breadboards to receive the reference stop assemblies is also possible. One skilled in the art will also understand that it is also possible to build a customized breadboard where only the required holes are machined for a pre-defined lens mount configuration.

Figure 7:
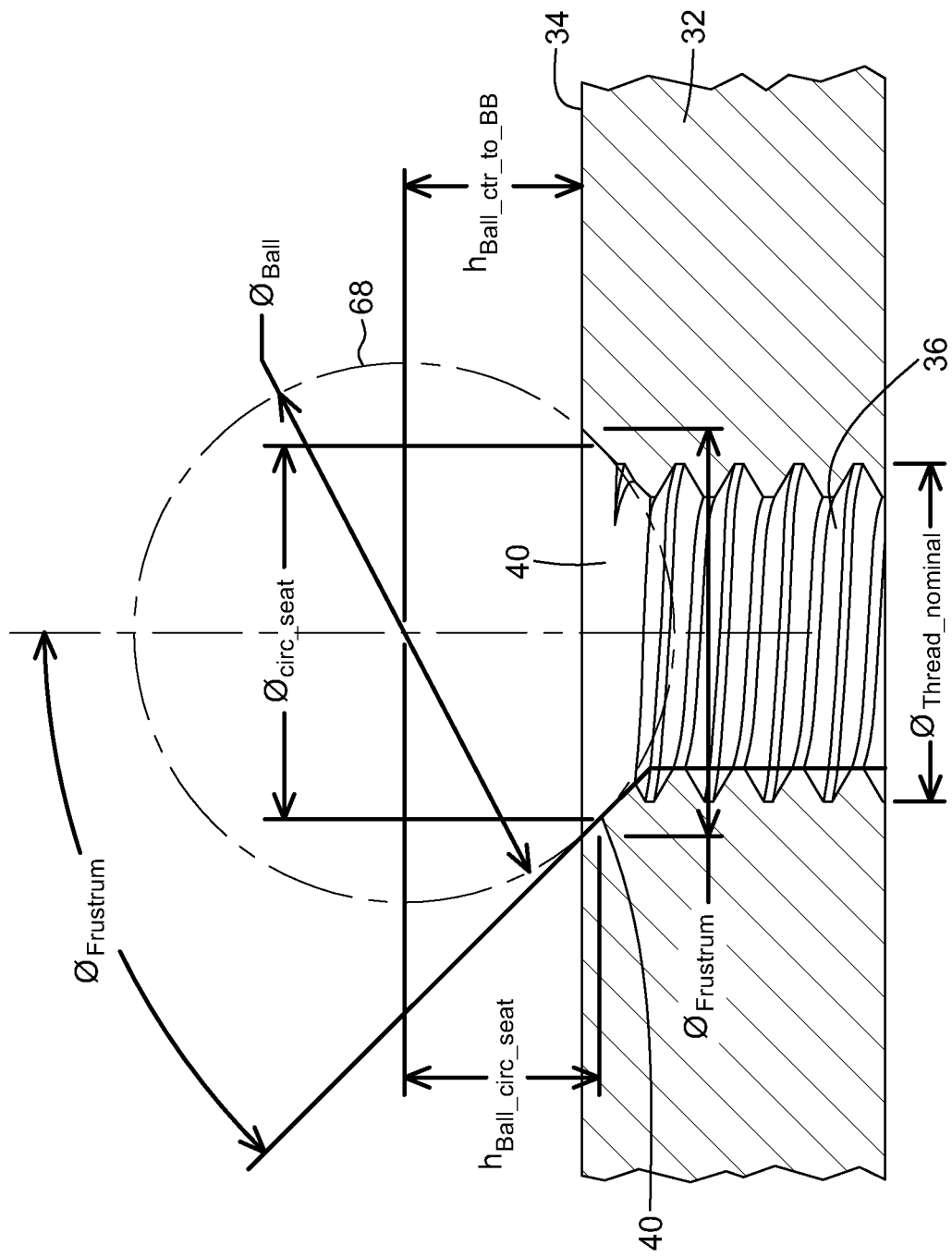
FIG. 7 illustrates the parameters relevant to the geometry of the engagement of a reference ball in a mounting hole.
Figure 9B:
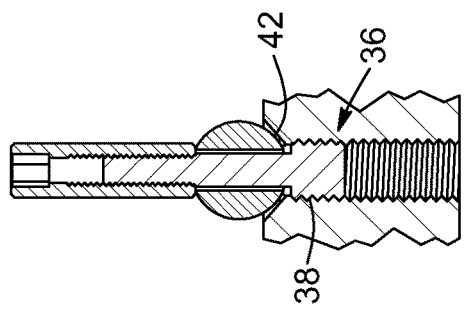
FIGS. 9A to 9D are cross-sectional views of reference balls engaging the mounting holes of FIGS. 8A to 8D, respectively.

In accordance with some implementations, for example with reference to FIG. 7, in the inverted conical frustum configuration of the enlargement 40 of the mounting holes 36, the cone and the reference balls are sized so that the reference balls 68 make contact with the circular seat 42 under the mounting surface 34 of the breadboard 32 and above the upper end of the threaded cavity 38 of the mounting hole 36. Such a configuration may be advantageous as, on one hand, the edge of the conical frustum located on the mounting surface 34 of the breadboard 32 may be prone to damages due to the potentially frequent optical mount manipulations performed on the breadboard 32. On the other hand, the lower portion of the frustum is irregular as the threads of the threaded cavity 38 start therein. It is therefore advantageous that the diameter of the circular seat 42 be smaller than the outer diameter of the conical frustum while being larger than the nominal diameter of the threads of the threaded cavity. Still referring to FIG. 7, it can be shown with a bit of geometry that the diameter $\phi_{Circ\_seat}$ of the circular seat 42 relates to the diameter $\phi_{Ball}$ of the seated reference ball 68 in the following way:

$$\phi_{Circ\_seat} := \phi_{Ball} \cdot \cos(\Theta_{Frustum})$$

where $\Theta_{Frustum}$ stands for the opening half-angle of the conical frustum. The vertical spacing $h_{Ball\_circ\_seat}$ between the plane of the circular seat 42 and the center of the reference ball 68 is then given by:

$$h_{Ball\_circ\_seat} := \frac{\phi_{Ball}}{2} \cdot \sin(\Theta_{Frustum}).$$

When the diameter $\phi_{Ball}$ of the reference ball 68 is such that the circular seat is located at mid-height in the conical frustum, the diameter $\phi_{Frustum}$ at the upper end of the conical frustum reads as:

$$\phi_{Frustum} := (2 \cdot \phi_{Circ\_seat} - \phi_{Thread\_nominal})$$

where $\phi_{Thread\_nominal}$ refers to the diameter of the lower end of the conical frustum, which corresponds, obviously, to the nominal thread diameter of the threaded cavity 38. In addition, the vertical spacing $h_{Ball\_ctr\_to\_BB}$ between the center of the reference ball 68 and the plane of the mounting surface 34 is computed according to:

$$h_{Ball\_ctr\_to\_BB} := \frac{\phi_{Ball}}{2} \cdot \sin(\Theta_{Frustum}) - \left(\frac{\phi_{Frustum} - \phi_{Circ\_seat}}{2}\right) \cdot \tan(\Theta_{Frustum})$$

The two following ratios are found to be particularly useful for selecting the values of the design parameters of the conical frustum as functions of the diameter of the reference balls to be seated therein:

$$R_{Frustum} := \frac{\phi_{Frustum}}{\phi_{Thread\_nominal}} \quad R_{Ball} := \frac{\phi_{Ball}}{\phi_{Thread\_nominal}}$$

By way of example, a reference ball diameter ratio $R_{Ball}$ of approximately 1.6 with respect to the nominal diameter of the threads and a diameter ratio $R_{Frustum}$ of 1.2 for the conical frustum were found to work properly for a frustum having an opening half-angle close to 45°. Other combinations of ratios and opening half-angles can work as well, some examples being given in the table below.

| Frustum half-angle $\Theta_{Frustum}$ | 30° | 45° | 60° |
|---|---|---|---|
| Frustum diameter ratio $R_{Frustum}$ | 1.5 to 1.75 | 1.2 to 1.25 | 1.38 to 1.5 |
| Reference ball diameter ratio $R_{Ball}$ | 1.59 | 1.59 | 2.38 |

Although almost any value in the range from 0° to 80° could be used for the opening half-angle of the conical frustum, one skilled in the art would understand that the load bearing capability of the reference stop assemblies 60 depends on the selected angle. Referring to FIG. 13, in use, the reference surface 56 of the optomechanical mount 52 that comes in contact with the reference ball 68 will press against the ball 68 with a horizontal force $F_{Exerted}$. Because the reference ball 68 is seated motionless in a conical frustum having a tilted sidewall, the sidewall at the position of the circular seat 42 will give rise to a force in reaction to the horizontal force $F_{Exerted}$ in such a way that an upwardly-directed resulting vertical force will be transmitted by the reference ball 68 and applied on the clamping member 70. Assuming frictionless contacts, the resulting vertical force in the frustum axis as shown in FIG. 13 can be defined as:

$$\begin{bmatrix} F_{Result\_horizontal} := F_{Exerted} & \text{The resulting horizontal force on the ball} \\ F_{Resulting} := \frac{F_{Result\_horizontal}}{\cos(\Theta_{Frustum})} & \text{The resulting force normal to the frustum surface at the ball circular seat} \\ F_{Result\_vertical} := & \\ F_{Resulting} \cdot \sin(\Theta_{Frustum}) & \text{The resulting vertical force on the ball} \end{bmatrix}$$

and can also be defined as:

$$F_{Result\_vertical} := F_{Result\_horizontal} \cdot \tan(\Theta_{Frustum})$$

As the reference ball 68 does not move, the sum of the forces exerted on the ball 68 along the vertical direction must vanish, meaning that the magnitude of the minimum downwardly-directed force $F_{Clamping}$ exerted by the clamping member 70 on the ball 68 is equal to the resulting vertical force introduced above:

$$F_{Clamping} := F_{Result\_vertical}$$

The magnitude of the clamping force exerted by the clamping member 70 then amounts to:

$$F_{Clamping} := F_{External} \cdot \tan(\Theta_{Frustum})$$

From the above formula, one can see that the magnitude of the minimum vertical downwardly-directed clamping force exceeds the magnitude of the horizontal force $F_{Exerted}$ coming from the pressing reference surface 56 of the mount 52 when the reference ball 68 is seated in a conical frustum having an opening half-angle greater than 45°.

Figure 6:
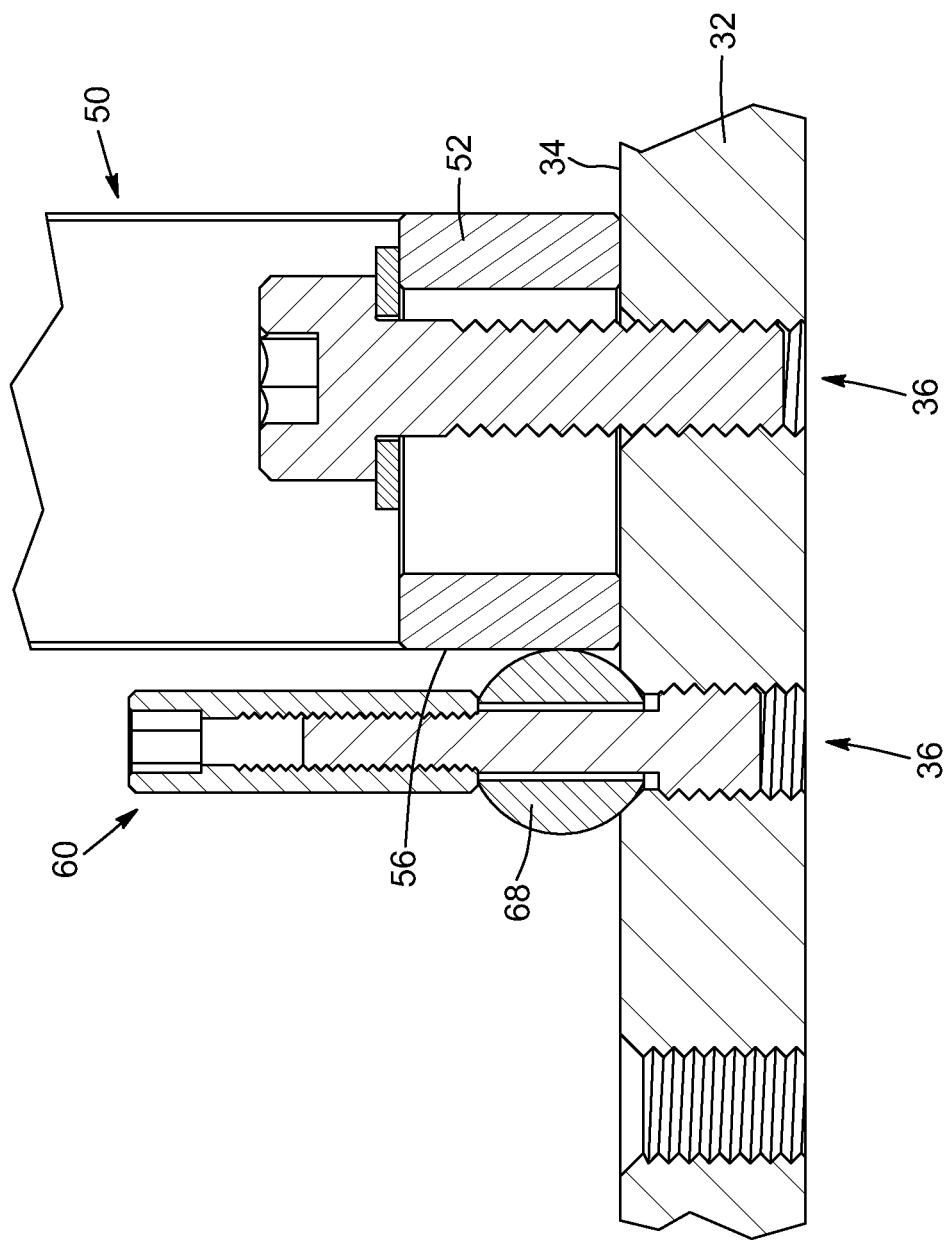
FIG. 6 is a cross-sectional view of the engagement of a mount with a reference stop assembly.

As mentioned above, once a set of reference stop assemblies 60 has been properly mounted on the breadboard 32 to define a positioning reference for a given optomechanical structure 50, this optomechanical structure 50 is then positioned on the mounting surface 34 of the breadboard 32 against the reference balls 68 of the reference stop assemblies 60. In some implementations, shown for example in FIG. 6, a reference surface 56 on a side of the mount 52 of the optomechanical structure 50 may be abutted directly against one or more reference ball 68. In other variants, precision shims or precision spacer stacks may also be inserted between the mount 52 and the reference balls 68, for example to position the mount 52 at intermediate positions between mounting holes 36 of the breadboard 32. Once in the desired position, the optomechanical structure 50 is secured to the breadboard 32 using, for example, conventional clamping hardware. The reference stop assemblies 60 may then be removed from the breadboard 32. The same set of reference stop assemblies 60 can then be used to locate the next mount 52 on the breadboard 32, and so on. Advantageously, only a few reference stop assemblies 60 are required to align all the optomechanical structures 50 of an optomechanical system 30 and no cumbersome material needs to remain permanently on the breadboard 32.

Figure 4:
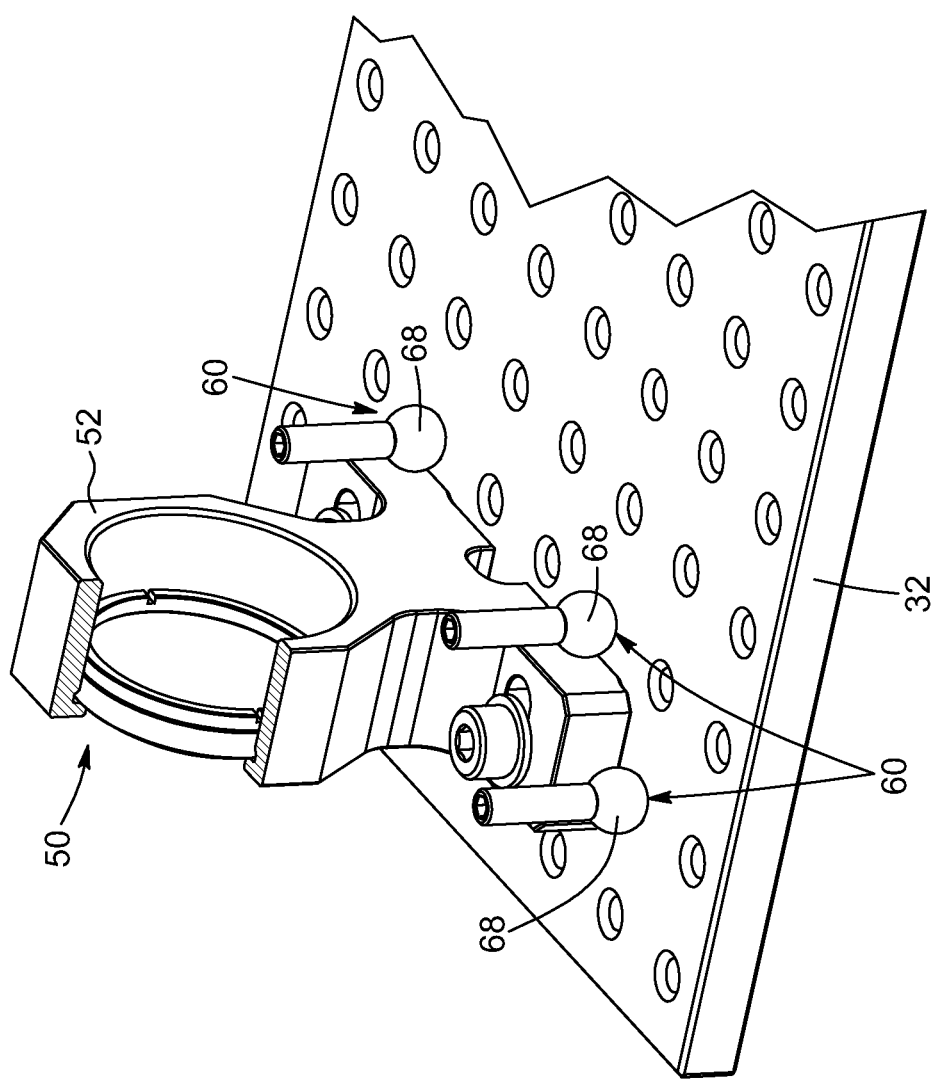
FIG. 4 is an isometric view of the mounting of an exemplary optical mount on a breadboard using reference stop assemblies.
Figure 5:
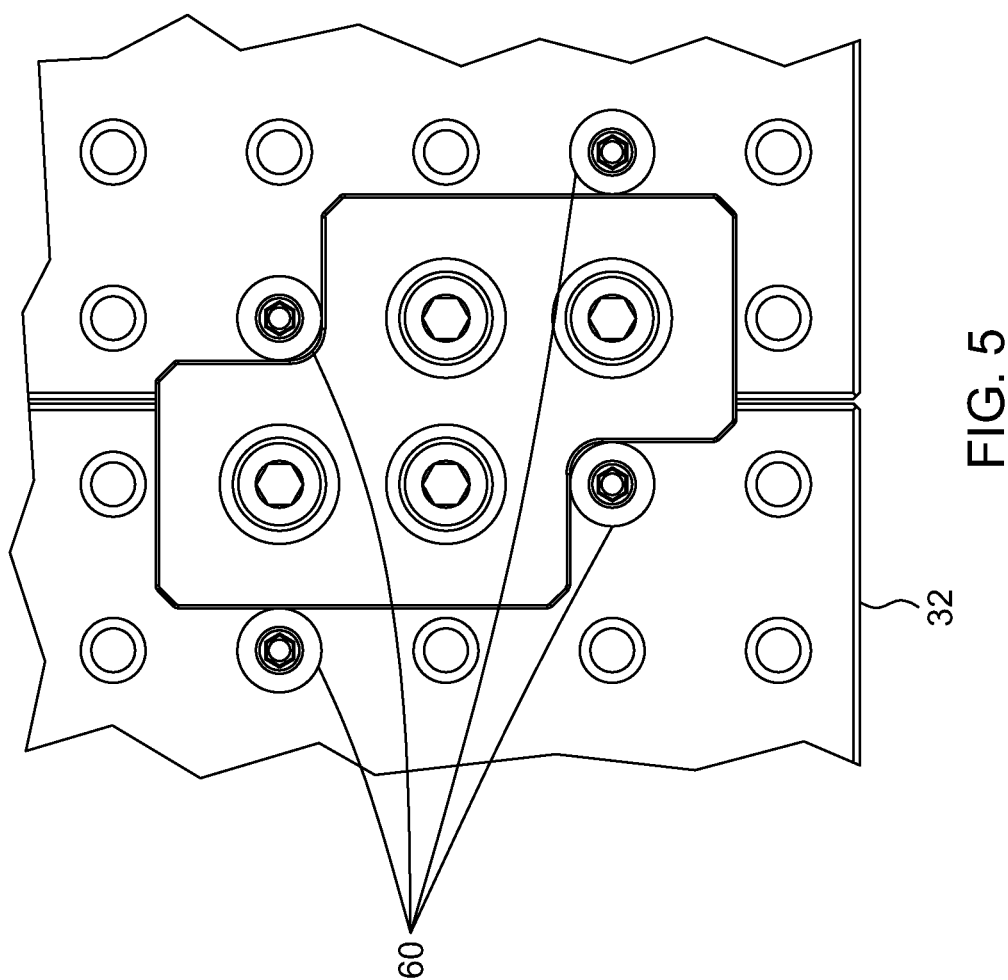
FIG. 5 is a top view of the mounting of a part used for the precise junction of two breadboards using reference stop assemblies.

Referring back to FIG. 1 and with additional reference to FIGS. 4 and 5, the number of reference stop assemblies 60 and their distribution over the breadboard 32 to define a proper positioning reference for a given mount 52 depend on the geometry of this mount. The breadboard 32 itself allows to fix three of the six degrees of freedom of the mount: vertical translation, pitch rotation and roll rotation. The other three degrees of freedom are defined by the reference balls 68: yaw rotation, i.e., rotation about a vertical axis (assuming herein that the breadboard 32 is disposed in a horizontal plane), axial and lateral translations. In this description, the qualifier "axial" refers to the horizontal direction parallel to the optical axis while the qualifier "lateral" refers to the horizontal direction perpendicular to the optical axis of the optomechanical system 30. In some implementations, depending on the geometry of the mount, two, three or more reference stop assemblies 60 may be required, as for example shown in FIG. 4 and FIG. 5.

Figure 14:
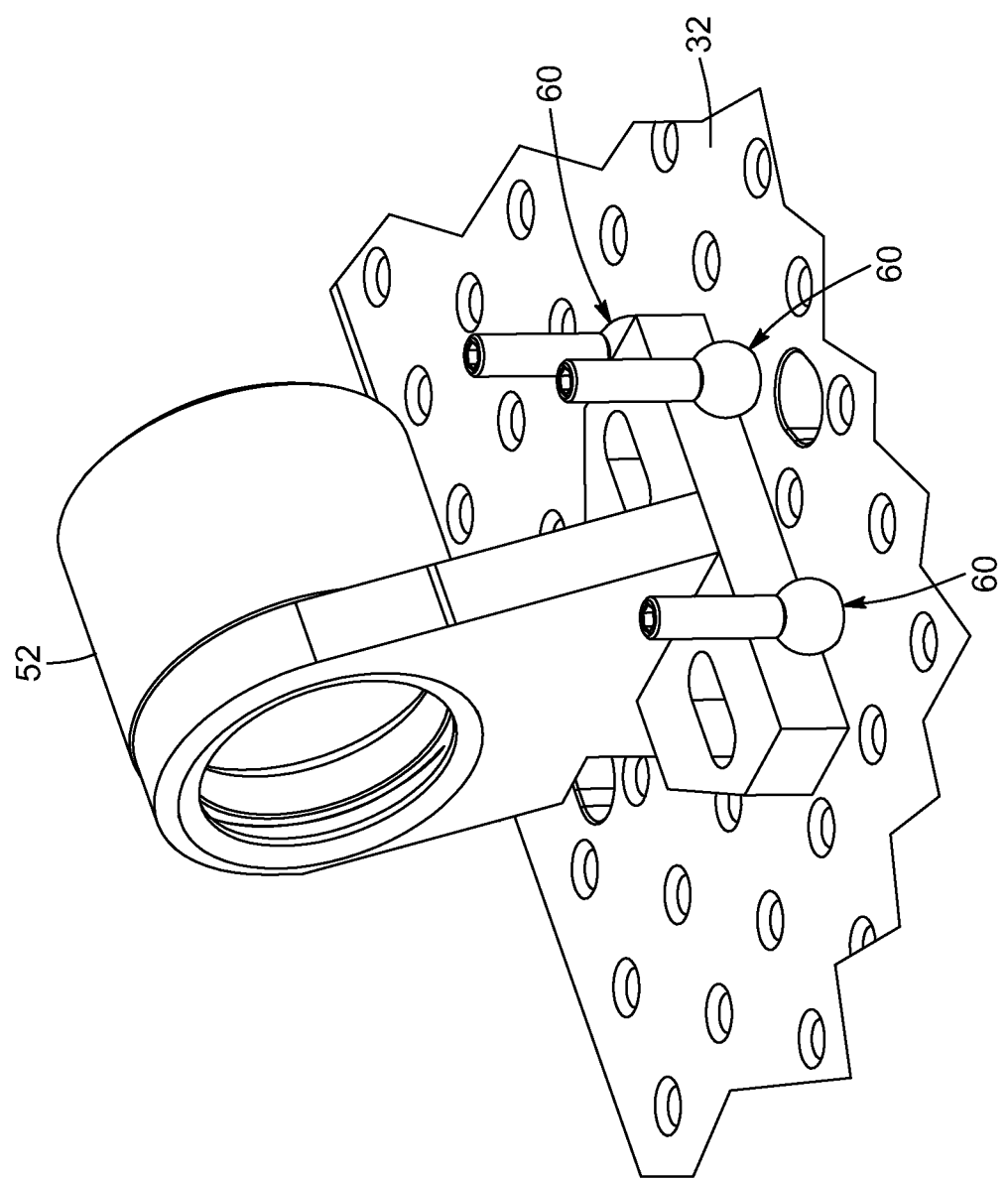
FIG. 14 is an isometric view showing the use of two or more reference stop assemblies located to define a direction parallel to the optical axis of a mounted lens.

In accordance with some variants, two or more of the reference stop assemblies 60 may be located in such a way that they define a direction parallel to the optical axis, as shown in FIG. 14. This configuration has the advantage to allow referenced translations along the optical axis, for example for focus adjustments. These translations can be achieved by manual translations with only two contacts points if the user has a visual feedback, for example or with the use of stackable precision shims inserted between the mount 52 and a perpendicularly disposed reference stop assembly 60. Such an adjustment may be performed at the time of building of the assembly. In some implementations, the reference stop assemblies 60 used in this manner may remain on the breadboard 32 after the building of the optomechanical system to provide the focus adjustment after the optomechanical system has been installed in its intended location.

Figure 15:
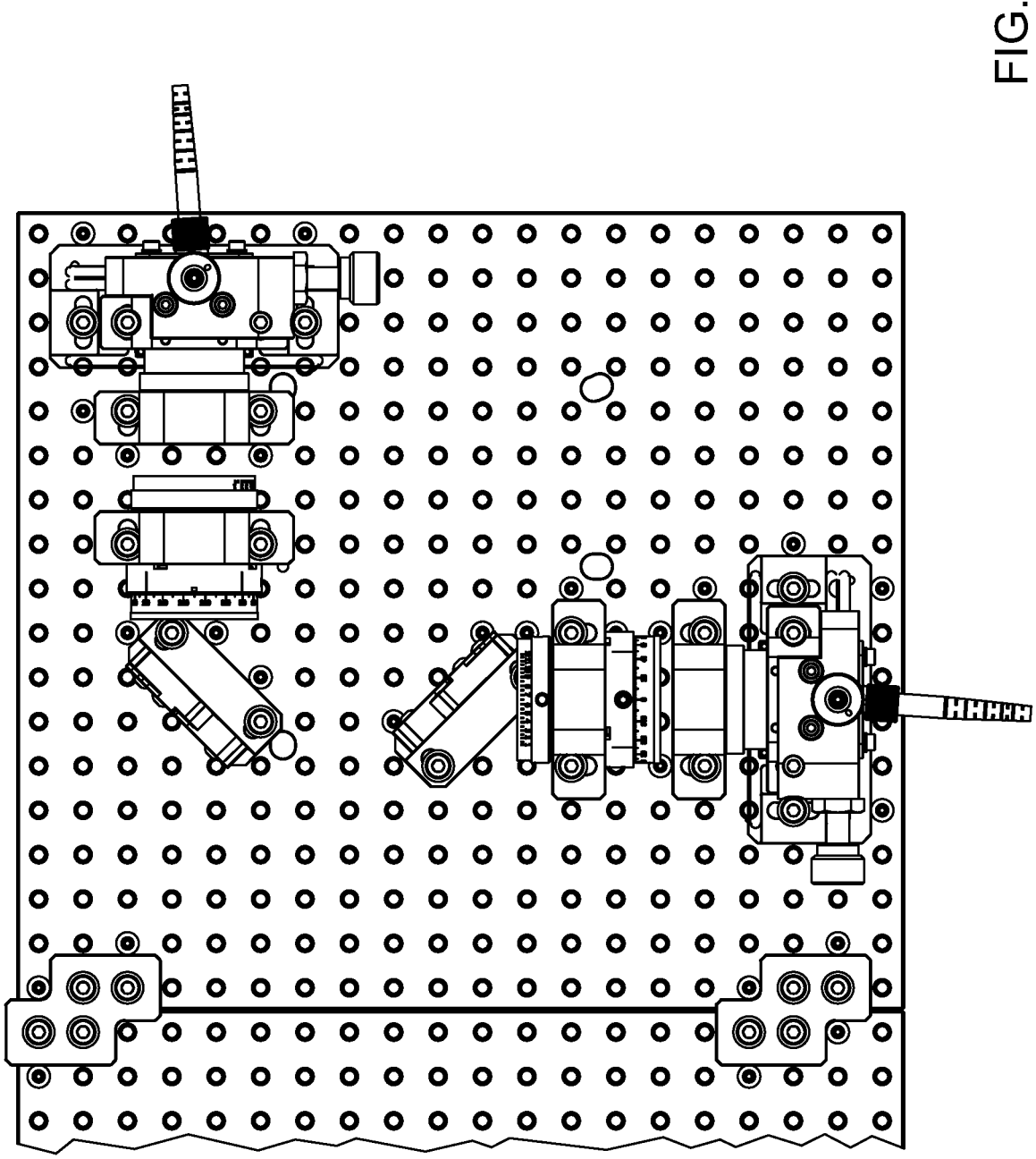
FIGS. 15 to 20 illustrate the use of reference stop assemblies to build various designs of optomechanical systems.
Figure 16:
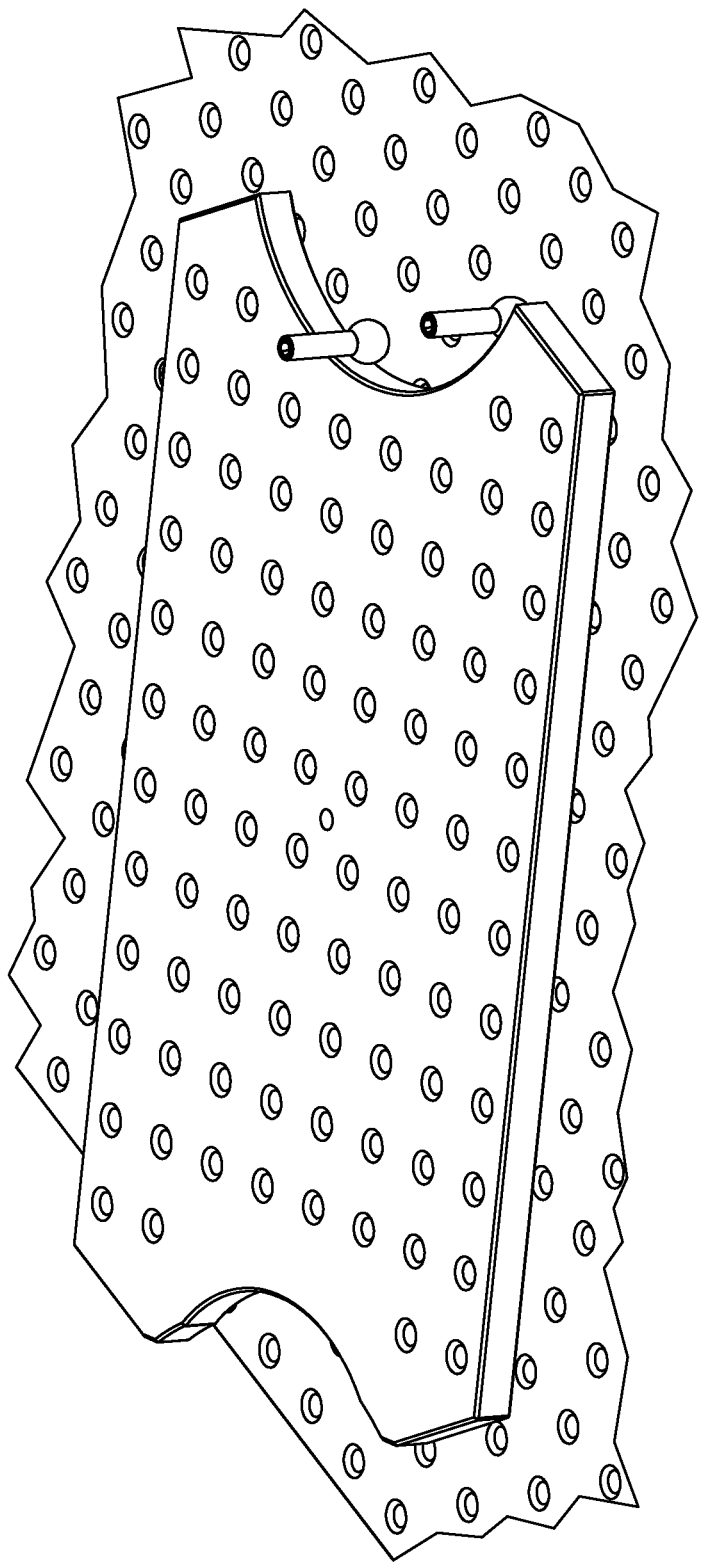
Figure 17:
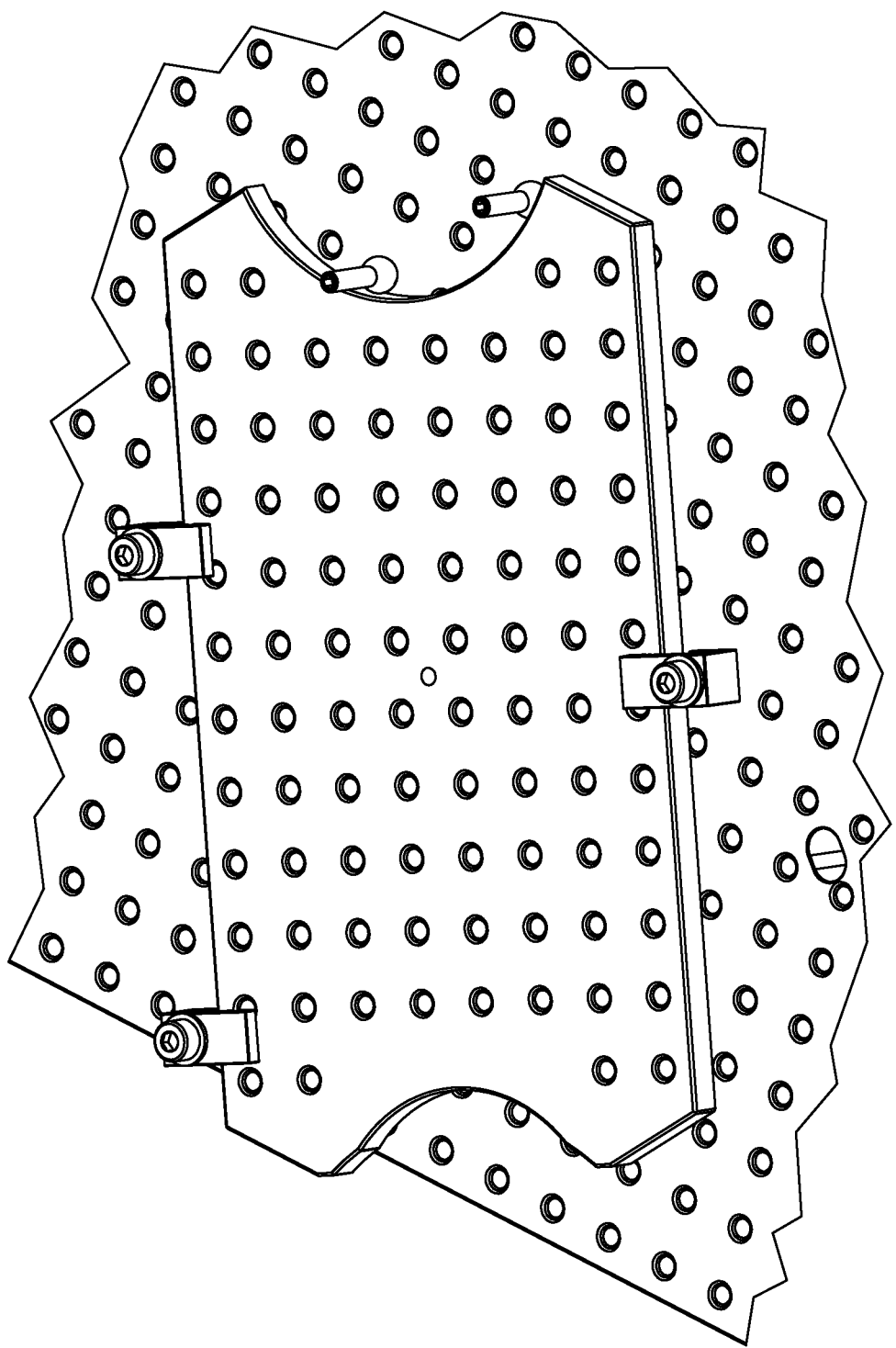
Figure 18:
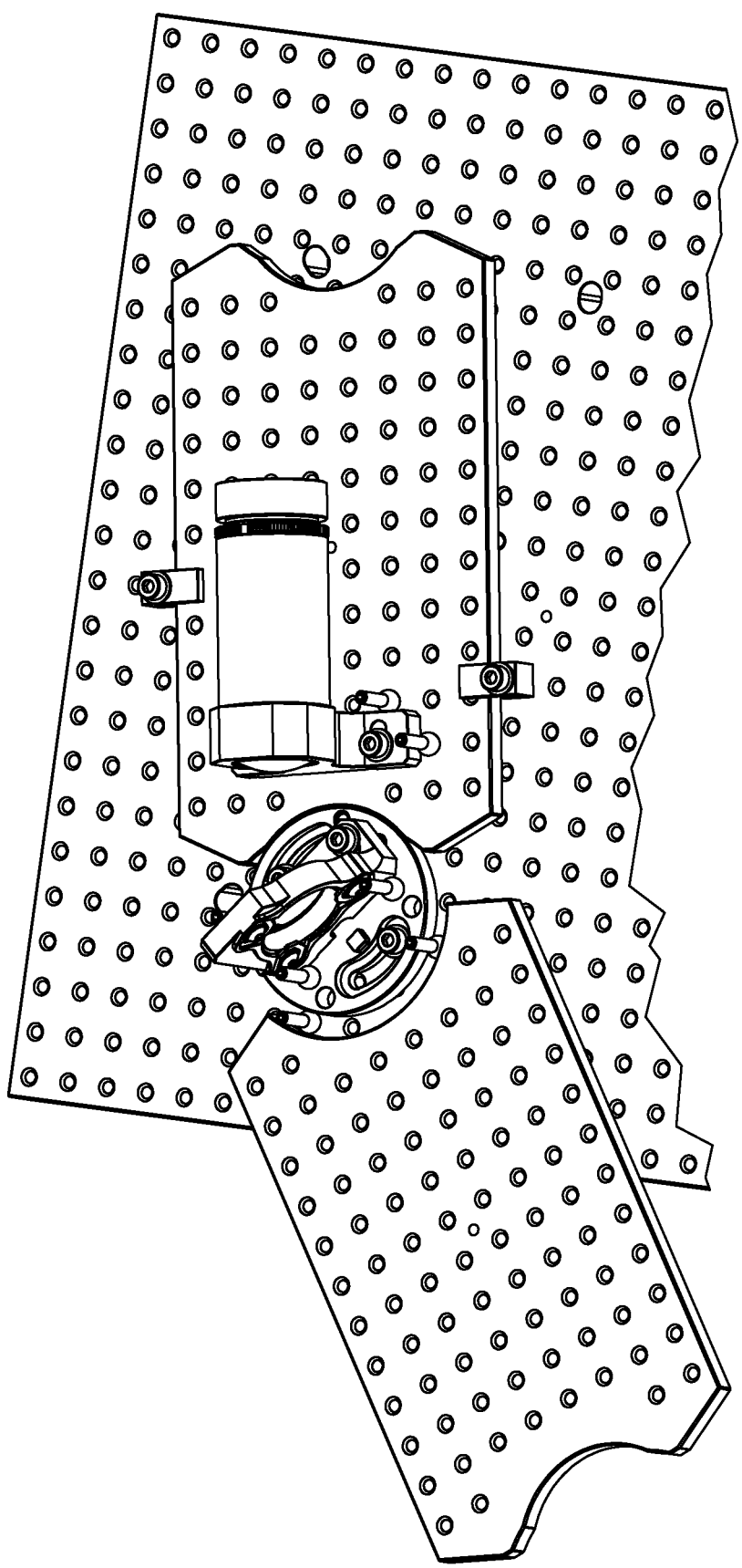
Figure 19:
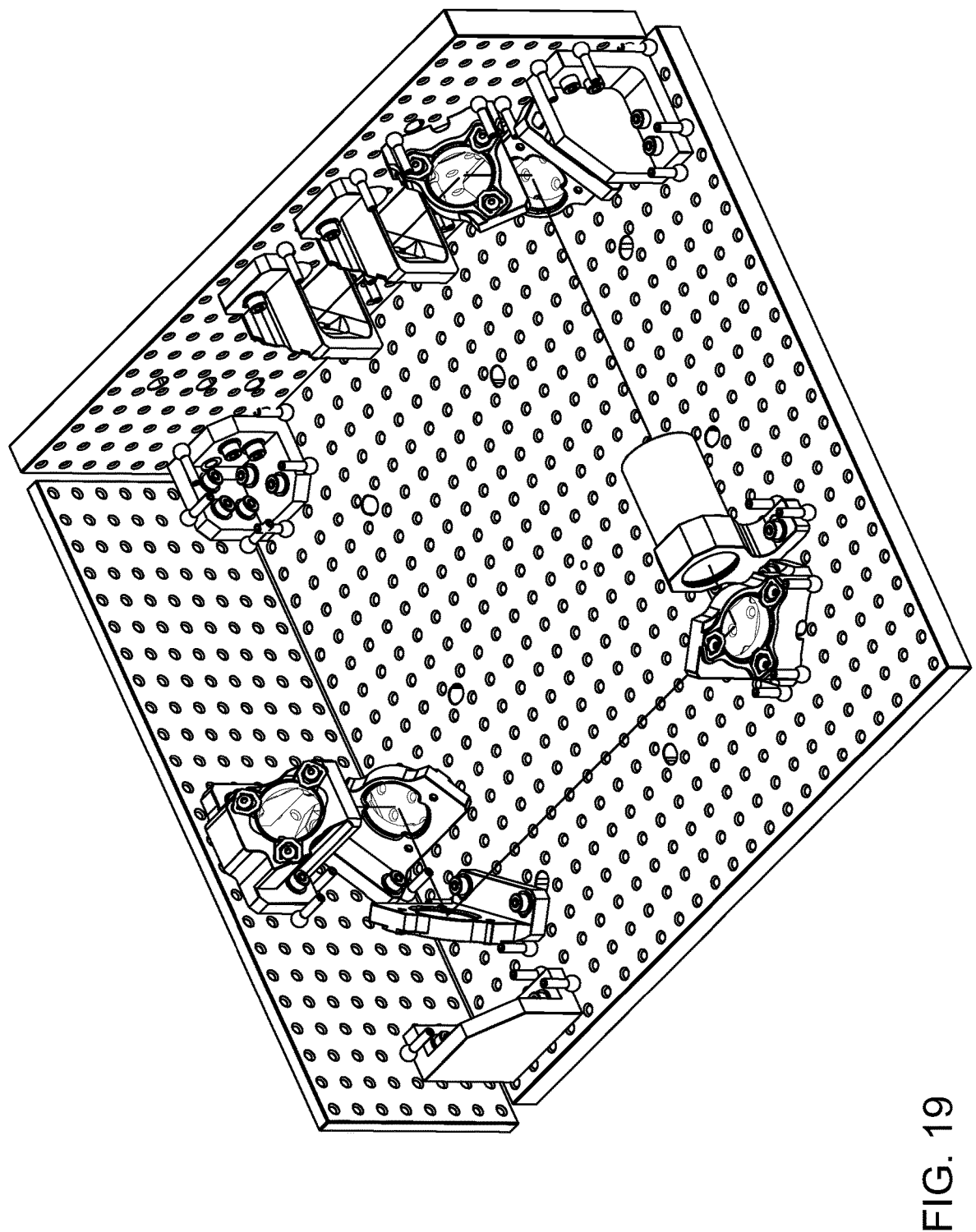
Figure 20:
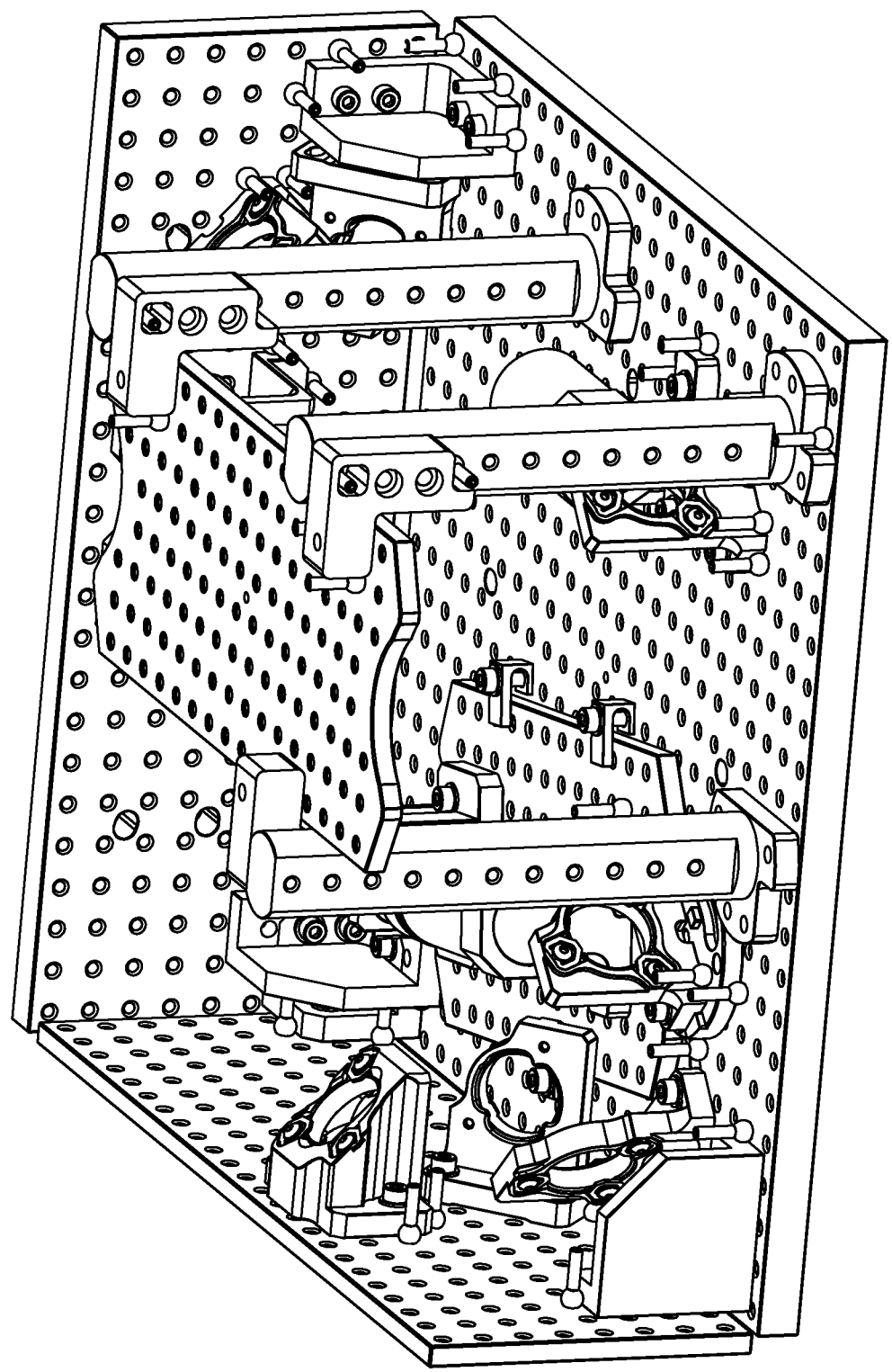

In some implementations, the reference stop assemblies 60 described herein may be used in aspects of the building of optomechanical systems beyond the alignment of optical mounts, such as for example:

Locating multiple breadboards one with respect to the other (see FIG. 15);
Mounting breadboards at various angles (see FIGS. 16 to 18);
Mounting breadboards perpendicularly one with respect to the other, allowing 3D optical layouts (see FIG. 19)
Multi-height concept (see FIG. 20).

Figure 21:
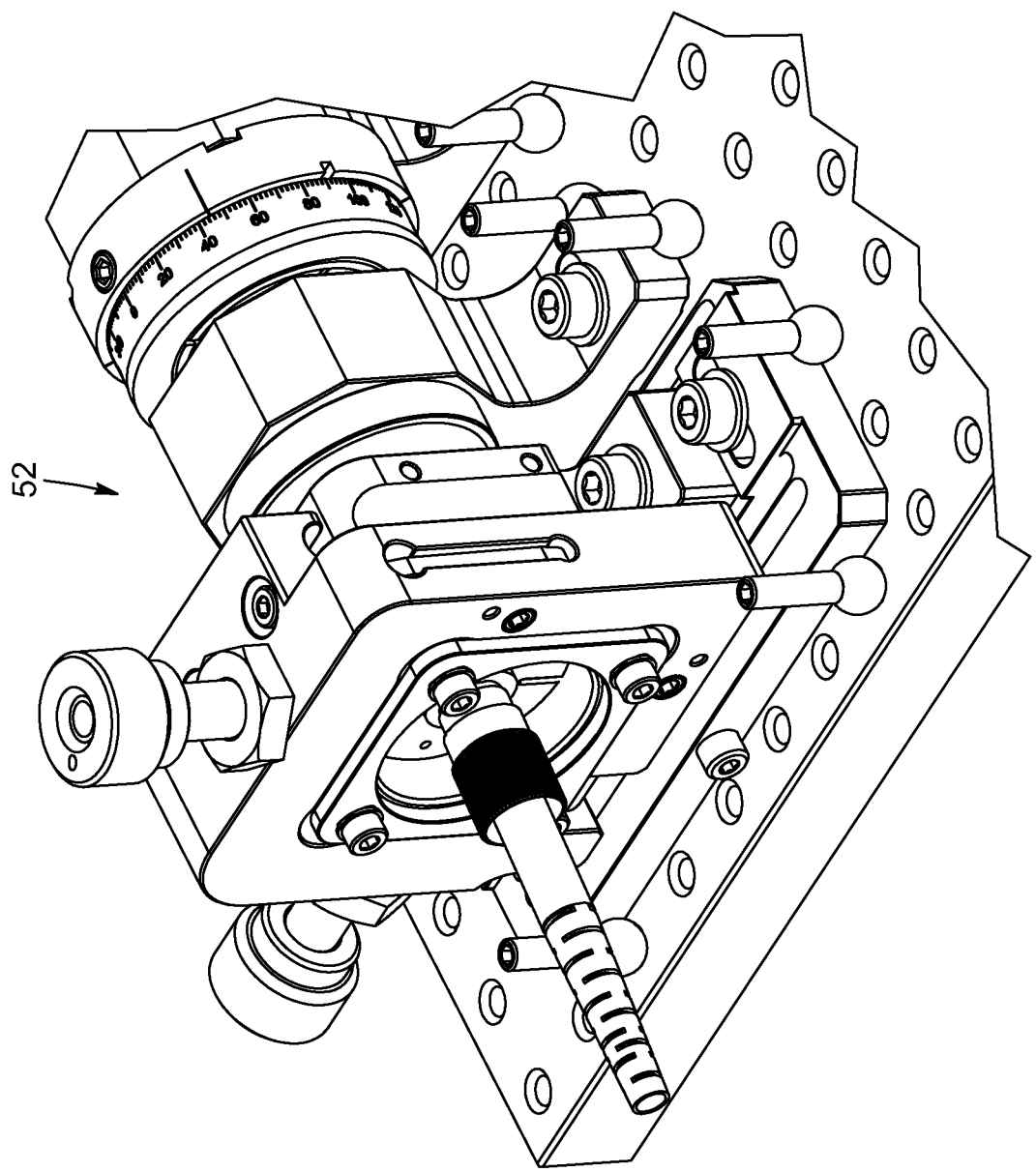
FIG. 21 is an isometric view illustrating the use of an optomechanical mount having one or more adjustable degrees of freedom for the precise optical coupling of an optical fiber to an assembly of bulk optical components.

As a variation, it is possible to use an optomechanical mount 52 with one or more adjustable degrees of freedom to have the capability to align the optical axis of optical components within a precision of less than 1 µm. In this specific case, the advantage of using the three removable reference stop assembly locating technique would be to define a nominal assembly position not too far from the ideal/theorical design position and also to obtain a precise repeatable feature for removing/assembling, as shown in FIG. 21. One skilled in the art would also understand that an adjustable mount 52 could also be used to place on the nominal axis a component that is not intrinsically well centered by nature, such as a CCD or a CMOS camera, an optical sensor or an optical fiber connector, to name a few.

It will be readily understood that the steps of the method of building an optomechanical system 30 presented above and their orders may be adapted according to the needs of a given implementation. In one typical example, the method may be carried out as follows:

1. The reference stop assemblies 60 are screwed on the breadboard 32 according to the desired position of a first lens or other optical element 54;
2. The first lens is inserted in its mount 52 and centered with respect to the mount 52 using an appropriate method such as edge contact mounting;
3. The mount 52 (with the lens mounted therein) is placed on the breadboard 32 and registered against the reference balls 68 of the reference stop assemblies 60;
4. The mount 52 is clamped to the breadboard 32;
5. The reference stop assemblies 60 are removed from the breadboard 32;
6. The steps listed above are repeated for each optical element 54 of the system.

The use of reference balls as described herein has multiple advantages with respect to other possible mechanical designs:

Due to its symmetry in every direction (spherical symmetry) only three degrees of freedom (translations) need to be locked to define the position of a spherical ball in space.
Spheres make single-point contact with the surface of the optical mount, and this contact is therefore not sensitive to parallelism errors, compared to other designs such as locating pins or reference planes.
In the variant where the circular seat is provided by a conical frustum, the corresponding shape of the enlargement of the mounting hole is simple to make on a breadboard for those skilled in the art, and the tools required are often already used in the breadboard fabrication, including: CNC machining, punching, stamping, forging, electrical discharge machining and molding, to name a few.
A sphere-to-cone and sphere-to-plane contact is very repeatable from one trial to another. In some implementations, the combined effect of the sphere-to-cone and sphere-to-plane repeatability has been found to be less than ±5 µm at 2 sigma.

In accordance with some aspects, there is provided a robust optomechanical system 30 built using a variant of the method described above, using optical mounts 52 free of optical element adjustment mechanisms. Advantageously, such systems may be more resistant to the rigors of shipping and other displacements of the breadboards without damaging the alignment of the optical components, and therefore not requiring a qualified optical engineer or technician to adjust the alignment of the system after it has been installed in its location of use.

In accordance with another aspect, kits may be provided for the building of optomechanical systems. Such kits may include a plurality of reference stop assemblies 60 as described above. Hence, each reference stop assembly may include a threaded base engageable with a breadboard 32 to removably mount the reference stop assembly thereto, a support shaft connected to the threaded base, a reference ball captively mounted to the support shaft and having a translational play in a plane perpendicular to said support shaft, and a clamping member mounted to the support shaft over the reference ball. Each reference stop assembly is configured such that, when the reference stop assembly is mounted to the breadboard, the support shaft projects normally to the mounting surface of the breadboard and the clamping member cooperates with the breadboard so as to apply a clamping force to clamp the reference ball against a circular seat of one of the mounting holes of the breadboard. The kits may further include a plurality of optomechanical mounts each having one or more reference surfaces configured to abut on the reference balls of the reference stop assemblies. In typical implementations, the optomechanical mounts may have shapes and dimensions commensurate with each other and enabling their easy alignment on a breadboard using the associated reference stop assemblies.

In some implementations of the kit, for one or more of the reference stop assemblies 60 the reference ball 68 has a clearance channel 72 extending through a diameter axis thereof, the support shaft 66 extending through said clearance channel with said translational play therebetween. The clamping member includes a locking pin 74 affixed to the support shaft, the reference ball extending between the threaded base 64 and the locking pin. In some variants the support shaft projects integrally from the threaded base, such as shown in FIG. 10A, and in other variants the support shaft is screwed into the threaded base, such as shown in FIG. 10B.

In some implementations of the kit, one or more of the reference stop assemblies includes a support clip affixed to the support shaft and a side-mounting mechanism loosely mounting the reference ball to the support clip alongside the support shaft. The support clip preferably includes a flange projecting sideways from the support shaft over the reference ball and defining the clamping member.

In some implementations of the kit, one or more mounts of the plurality of optomechanical mounts has an optical element rigidly affixed to said one or more mounts.

The kits may further include a breadboard having a mounting surface and a plurality of mounting holes extending through the mounting surface, the mounting holes each having a threaded cavity. At least some of the mounting holes have a circular seat extending parallel to the mounting surface and may have an enlargement shaped as a conical frustum, as explained above.

It will be further understood that any of the components of such kits may be provided separately, for example as a spare part to complete or repair an existing kit or system.

Of course, numerous modifications could be made to the embodiments described above without departing from the scope of protection.

The invention claimed is:

1. A reference stop assembly for use in building a system on a breadboard having a mounting surface provided with a plurality of mounting holes, the reference stop assembly comprising:
   a threaded base engageable with the breadboard to removably mount the reference stop assembly thereto;
   a support shaft connected to the threaded base;
   a reference ball captively mounted to the support shaft and having a translational play in a plane perpendicular to said support shaft; and
   a clamping member mounted to the support shaft over the reference ball;
wherein said reference stop assembly is configured such that, when the reference stop assembly is mounted to said breadboard, the support shaft projects normally to the mounting surface of the breadboard and the clamping member cooperates with the breadboard so as to apply a clamping force to clamp the reference ball against a circular seat of one of the mounting holes of the breadboard.

2. The reference stop assembly according to claim 1, wherein:
   the reference ball comprises a clearance channel extending through a diameter axis thereof, the support shaft extending through said clearance channel with said translational play therebetween; and
   the clamping member comprises a locking pin affixed to the support shaft, the reference ball extending between the threaded base and the locking pin.

3. The reference stop assembly according to claim 2, wherein the support shaft projects integrally from the threaded base.

4. The reference stop assembly according to claim 2, wherein the support shaft is screwed into the threaded base.

5. The reference stop assembly according to claim 1, comprising:
   a support clip affixed to the support shaft; and
   a side-mounting mechanism loosely mounting the reference ball to the support clip alongside the support shaft;
wherein the support clip comprises a flange projecting sideways from the support shaft over the reference ball and defining the clamping member.

6. The reference stop assembly according to claim 5, wherein the side-mounting mechanism comprises one of an arrangement of magnets affixed to the support clip and a flexible ribbon affixed to the support clip.

7. A kit for the building of an optomechanical system, comprising:
   a plurality of reference stop assemblies according to claim 1; and
   a plurality of optomechanical mounts, each optomechanical mount having one or more reference surfaces configured to abut on the reference balls of the reference stop assemblies.

8. The kit according to claim 7, wherein, for one or more of said reference stop assemblies:
   the reference ball comprises a clearance channel extending through a diameter axis thereof, the support shaft extending through said clearance channel with said translational play therebetween; and
   the clamping member comprises a locking pin affixed to the support shaft, the reference ball extending between the threaded base and the locking pin.

9. The kit according to claim 8, wherein, for each of said one or more of said reference stop assemblies, the support shaft projects integrally from the threaded base.

10. The kit according to claim 8, wherein, for each of said one or more of said reference stop assemblies, the support shaft is screwed into the threaded base.

11. The kit according to claim 7, wherein one or more of said reference stop assemblies comprises:
   a support clip affixed to the support shaft; and
   a side-mounting mechanism loosely mounting the reference ball to the support clip alongside the support shaft;

wherein the support clip comprises a flange projecting sideways from the support shaft over the reference ball and defining the clamping member.

12. The kit according to claim 7, wherein one or more mounts of the plurality of optomechanical mounts has an optical element rigidly affixed to said one or more mounts.

13. The kit according to claim 7, further comprising a breadboard having a mounting surface and a plurality of mounting holes extending through the mounting surface, the mounting holes each having a threaded cavity, and at least some of the mounting holes comprising a circular seat parallel to the mounting surface.

14. The kit according to claim 13, wherein each of the at least some of the mounting holes of the breadboard comprising a circular seat comprises an enlargement between the threaded cavity and the mounting surface, the circular seat extending in the enlargement and having a diameter larger than a diameter of the threaded cavity.

15. The kit according to claim 14, wherein said enlargement has a conical frustum shape.

16. A method for building an optomechanical system, comprising:
   a. providing a breadboard having a mounting surface and a plurality of mounting holes extending through the mounting surface, the mounting holes each having a threaded cavity and at least some of the mounting holes comprising a circular seat parallel to the mounting surface;
   b. mounting one or more optomechanical structures on said breadboard, said mounting comprising, for each optomechanical structure:
      i. providing two or more reference stop assemblies, each reference stop assembly comprising a threaded base, a support shaft connected to the threaded base, a reference ball captively mounted to the support shaft and having a translational play in a plane perpendicular to said support shaft, and a clamping member mounted to the support shaft over the reference ball;
      ii. associating each reference stop assembly with one of the mounting holes of the breadboard having a circular seat so as to define a positioning reference for said optomechanical structure, and screwing the threaded base of each reference stop assembly into the threaded cavity of the associated mounting hole until the corresponding reference ball is clamped against the circular seat of the associated mounting hole by the clamping member; and
      iii. positioning the optomechanical structure on the mounting surface of the breadboard against the reference balls of said reference stop assemblies, and securing the optomechanical structure to the breadboard in position.

17. The method according to claim 16, further comprising, after the mounting of the one or more optomechanical structures, removing the reference stop assemblies from the breadboard.

18. The method according to claim 16, wherein each of the at least some of the mounting holes comprising a circular seat comprises an enlargement between the threaded cavity and the mounting surface, the circular seat extending in the enlargement and having a diameter larger than a diameter of the threaded cavity.

19. The method according to claim 18, wherein said enlargement has a conical frustum shape.

20. The method according to claim 16, wherein at least one of the one or more optomechanical structures has an optical axis and comprises an optical mount and an optical element rigidly affixed to said optical mount and precisely aligned with said optical axis.

21. The method according to claim 20, wherein the optical mount has one or more reference surfaces, and the positioning of the optomechanical structure comprises abutting said one or more reference surfaces on the reference balls of the associated reference stop assemblies.

22. The method according to claim 20, wherein at least one of the one or more optomechanical structures is free of any optical element adjustment mechanism.

23. The method according to claim 16, wherein, for each of said reference stop assemblies:
   the reference ball comprises a clearance channel extending through a diameter axis thereof, the support shaft extending through said clearance channel with said translational play therebetween; and
   the clamping member comprises a locking pin affixed to the support shaft, the reference ball extending between the threaded base and the locking pin.

24. The method according to claim 23, wherein, for each of said reference stop assemblies, the support shaft projects integrally from the threaded base.

25. The method according to claim 23, wherein, for each of said reference stop assemblies, the support shaft is screwed into the threaded base.

26. The method according to claim 16, wherein each of said reference stop assemblies comprises:
   a support clip affixed to the support shaft; and
   a side-mounting mechanism loosely mounting the reference ball to the support clip alongside the support shaft;
wherein the support clip comprises a flange projecting sideways from the support shaft over the reference ball and defining the clamping member.

* * * * *